US012771275B2

(12) United States Patent
Abarzadeh et al.

(10) Patent No.: US 12,771,275 B2
(45) Date of Patent: Oct. 20, 2026

(54) REDUCTION OF ELECTROMAGNETIC INTERFERENCE USING RANDOM FINITE FREQUENCY SET PULSE-WIDTH MODULATION

(71) Applicant: SMARTD TECHNOLOGIES INC., Montréal (CA)

(72) Inventors: Mostafa Abarzadeh, Côte Saint-Luc (CA); Simon Caron, Outremont (CA)

( * ) Notice: Subject to any disclaimer, the term of this patent is extended or adjusted under 35 U.S.C. 154(b) by 242 days.

(21) Appl. No.: 18/709,545

(22) PCT Filed: Nov. 23, 2022

(86) PCT No.: PCT/CA2022/051721

§ 371 (c)(1),
(2) Date: May 13, 2024

(87) PCT Pub. No.: WO2023/092224

PCT Pub. Date: Jun. 1, 2023

(65) Prior Publication Data

US 2025/0007441 A1 Jan. 2, 2025

Related U.S. Application Data

(60) Provisional application No. 63/283,263, filed on Nov. 25, 2021.

(51) Int. Cl.
*H02P 27/14* (2006.01)
*H02P 27/06* (2006.01)

(52) U.S. Cl.
CPC .................................... *H02P 27/14* (2013.01)

(58) Field of Classification Search
CPC ................................ H02P 27/14; H02P 27/06
See application file for complete search history.

(56) References Cited

U.S. PATENT DOCUMENTS 9,614,518 B2 * 4/2017 Lizama .............. H03K 17/0414
10,476,390 B2 * 11/2019 Petersen ................ H02M 1/14
(Continued)

OTHER PUBLICATIONS

Abarzadeh et al., "Novel Simplified Single Carrier PWM Method for 5L ANPC Converter with Capacitor Voltage Self-Balancing and Improved Output Voltage Spectrum," 2019 IEEE 28th International Symposium on Industrial Electronics (ISIE), pp. 2021-2026, Jun. 12, 2019 (Jun. 12, 2019).

(Continued)

*Primary Examiner* — Thai T Dinh
(74) *Attorney, Agent, or Firm* — Anglehart et al.

(57) ABSTRACT

As more power electronics apparatuses use fast switches, such as silicon carbide (SiC) or gallium nitride (GaN) switches, to improve the efficiency and reduce switching losses, significantly higher electromagnetic interferences (EMI) are generated as a result. While techniques of random pulse-width modulation (PWM) have been developed to reduce this increased EMI, the use of such techniques leads to an unbalance of the stored electric energy of the energy storing components used to balance the energy across some of the switches of these apparatuses. This issue can be solved with a novel pulse width modulation method for generating the switching signals with variable frequencies for a converter's high-frequency switches that better balance its energy balancing components. This novel method can utilize comparing a reference signal to a carrier signal that can be generated with various switching frequencies that are phase-shifted from the following set of switching frequency, by (2N−1) π radians.

26 Claims, 11 Drawing Sheets

(56) References Cited

U.S. PATENT DOCUMENTS

| | | | | |
|---|---|---|---|---|
| 11,258,359 | B2 * | 2/2022 | Baek | H02M 3/07 |
| 11,848,612 | B2 * | 12/2023 | Cannillo | H02M 1/0009 |
| 11,990,831 | B2 * | 5/2024 | Petersen | G06F 1/3206 |
| 12,107,513 | B2 * | 10/2024 | Yamamoto | H02M 7/487 |
| 2017/0256950 | A1 | 9/2017 | Kuai | |

OTHER PUBLICATIONS

Abarzadeh et al., "An Improved Model Predictive Controller for Five-Level Active-Neutral-Point-Clamped Converter," 2018 IEEE Electrical Power and Energy Conference (EPEC), pp. 1-6, Oct. 10, 2018 (Oct. 10, 2018).

Peter et al., "A Single Phase, Single Stage AC-DC Multilevel LLC Resonant Converter With Power Factor Correction," in IEEE Access, vol. 9, pp. 70884-70895, May 7, 2021 (Jul. 5, 2021).

Teymour et al., "Novel modulation and control strategy for five-level ANPC converter with unbalanced DC voltage applied to a single-phase grid connected PV system," 2013 IEEE Industry Applications Society Annual Meeting, pp. 1-8, Oct. 6, 2013 (Oct. 6, 2013).

Ebahimian et al., "Finite Control Set—Modulated Model Predictive Control for a 5L-Flying Capacitor Multilevel Converter," 2021 IEEE Applied Power Electronics Conference and Exposition (APEC), pp. 2537-2543, Jun. 14, 2021 (Jun. 14, 2021).

International application No. PCT/CA2022/051721 International Search Report dated Jan. 24, 2023.

International application No. PCT/CA2022/051721 Written Opinion of the International Searching Authority dated Jan. 24, 2023.

International application No. PCT/CA2022/051721 Supplementary International Search Report dated Feb. 28, 2024.

* cited by examiner

| Switching State | S4 | S3 | S2 | S1 | $V_{out}$ | $\Delta E_{Cfc}$ | $\Delta E_{Cdc}$ |
|---|---|---|---|---|---|---|---|
| $V_1$ | 0 | 0 | 0 | 0 | $-E/2$ | - | ↓ |
| $V_2$ | 0 | 0 | 0 | 1 | $-E/4$ | ↑ | ↓ |
| $V_3$ | 0 | 0 | 1 | 0 | $-E/4$ | ↓ | ↓ |
| $V_4$ | 0 | 0 | 1 | 1 | 0 | - | - |
| $V_5$ | 1 | 1 | 0 | 0 | 0 | - | - |
| $V_6$ | 1 | 1 | 0 | 1 | $+E/4$ | ↓ | ↑ |
| $V_7$ | 1 | 1 | 1 | 0 | $+E/4$ | ↑ | ↑ |
| $V_8$ | 1 | 1 | 1 | 1 | $+E/2$ | - | ↑ |

REDUCTION OF ELECTROMAGNETIC INTERFERENCE USING RANDOM FINITE FREQUENCY SET PULSE-WIDTH MODULATION

CROSS-REFERENCE TO RELATED APPLICATIONS

This application claims priority from U.S. provisional patent application 63/683,263 filed Nov. 25, 2021, the content of which is incorporated herein by reference.

TECHNICAL FIELD

This patent application relates to multi-level power converters.

BACKGROUND

Utilizing high-efficiency, high-power density, and more reliable power electronic converters in various industrial applications such as variable frequency drives (VFDs) require utilizing advanced configurations of power electronic converters and new generations of high-efficiency power devices. A wide variety of techniques are used to further improve the efficiency and reduce losses of these converters but doing so makes the device more complex and often creates alternative problems, challenges or losses further down the line. One of these techniques normally used to reduce switching loss consists of replacing the standard silicon-based insulated gate bipolar transistors and silicon-based metal oxide semiconductor field-effect transistors with silicon carbide (SiC) and/or gallium nitride (GaN) switches. However, replacing standard switches with these faster SiC and GaN switches causes significantly higher electromagnetic interference (EMI) which further requires the EMI filter to be enlarged and redesigned. In order to efficiently implement these fast switches, more advanced and enhanced modulation techniques are required for EMI suppression purposes.

It is known in certain types of power converters, DC to DC converters or two-level inverters for example, to use advanced pulse-width modulation (PWM) techniques such as random PWM and dithering techniques to reduce noise in the converter output. To Applicant's knowledge, random PWM techniques have not been applied to multi-level AC to DC or DC to AC or AC to AC power converters.

SUMMARY

Applicant has discovered that generating switching signals with variable frequencies for driving the switches of the high-frequency switches of various multi-level converters (MLCs) can lead to an imbalance of the energy storing components of the MLC.

Applicant has discovered that, for non-limiting embodiments comprising flying-capacitor-based MLCs, this can lead to an imbalance of the flying capacitor's voltage and that additional steps must be taken when generating such signals for the charging and discharging of the flying capacitor (FC) to be better balanced.

The applicant has developed a pulse width modulation method for generating the switching signals with variable frequencies for a converter's high-frequency switches that can better balance the energy storing components of the MLC. For example, this can result in a balancing of the flying capacitor's voltage to reduce its high-frequency voltage ripples for flying-capacitor-based converters or can result in a balancing of the current of the leg inductors of a 3L parallel converters.

The switching signal generator can be used to generate a switching signal that induces half a pulse for one of the charging/discharging states before the switching frequency is varied and induces half a pulse for the corresponding one of the discharging/charging states (opposed state) after the switching frequency is varied.

As experimentally demonstrated, this allows for significantly suppressing the amplitude of the high-frequency voltage ripples of the associated flying capacitor, thus reducing the required capacity and size of the FC, while still significantly reducing EMI and noise. In some embodiments, the switching signal generator can be digital and produce the described switching signal via a processor (microprocessor, DSP, FPGA, etc.) having a reference signal input.

In some embodiments, the switching signal regenerator is completely or partially analog or is completely or partially digital and is comprising a carrier signal, a reference signal, and a comparator for comparing these signals. In these cases, the half pulses of the opposed charging/discharging states at the switching frequency transition can be achieved by shifting a carrier signal by $(2N-1)\pi$ radians (i.e., 180°) when changing its switching frequency, where N is a natural number.

Applicants can implement this method to converters while combining one or more pulse width modulation methods. The converter can be and is not limited to a rectifier, an inverter, a MLC or a combination thereof. In some embodiments, the MLC is a three-level or five-level MLC. In some embodiments, the MLC is used in a three-phase variable frequency motor drive. In some embodiments, a three-phase variable frequency motor drive comprising three MLCs can have one switching signal modulator for all of the switches of the converters. The pulse width modulation methods can be and are not limited to a random pulse-width modulation (RPWM), random carrier-frequency modulation, a novel random finite frequency set (RFFS) presented in the description or a combination thereof.

In some embodiments, the converter is equipped with fast power switches operating at a frequency of over about 50 kHz for reducing the value and size of the capacitors, one or more pulse width modulation methods are used to reduce noise and electromagnetic interference, and the developed method for modulating the carrier signal is implemented to reduce both emanated electromagnetic interference and the flying capacitor ripple induced by the PWM.

In some embodiments, the switching signal regenerator is generating signals for more than the four switches connected to the flying capacitor.

In some embodiments, the switching signal generator is completely digital and can access a digital memory (non-transitory memory) storing one or more sequences of switches pulses respecting one or more of the PWM method comprising the described applicant's contribution when changing the switching frequency for generating one or more period of one or more alternative AC signals that can be repeated as needed.

Applicant proposes a first multi-level power converter comprising a DC terminal, an AC terminal, a flying capacitor, a pair of switches S1, S1' connected at one end to the AC terminal and at a second end to opposed terminals of the flying capacitor, a pair of switches S2, S2' connected at one end to opposed terminals of the flying capacitors and at a second end connected directly or indirectly to the DC terminal, where differential gating of the switches S1/S1' and the switches S2/S2' causes charging or discharging of the flying capacitor and common gating of the switches S1/S1' and the switches S2/S2' by-passes the flying capacitor, and a switching signal generator for generating switching signals for driving the switches S1, S1', S2, S2' having a reference signal input and comprising A) a variable frequency carrier signal generator for generating a carrier signal with a frequency that varies over time and a plurality of comparators connected to the carrier signal and to the reference signal for comparing the reference signal to the carrier signal and having a comparison output connected to respective gates of the switches S1, S1', S2, S2' or B) a non-transitory memory storing instructions and a processor operatively connected to respective gates of the switches S1, S1', S2, S2' for generating the switching signals for driving the switches at a frequency that varies over time. When the frequency that varies over time changes from one frequency to another, a last switch gate pulse at the one frequency is a half pulse for one of the switches S1/S1' and the switches S2/S2' and a first switch gate pulse of the other frequency is a half pulse for one of the switches S2/S2' and the switches S1/S1', respectively.

Applicant also proposes a second multi-level power converter comprising a DC terminal, an AC terminal, a first leg inductor connected to a first point of the AC terminal, a second leg inductor connected to the first point of the AC terminal, a pair of switches S1, S1' connected at one end to the first leg inductor and at a second end to opposed terminals of the DC terminal, a pair of switches S2, S2' connected at one end to the second leg inductor and at a second end to opposed terminals of the DC terminal, where a differential gating of the switches S1/S1' and switches S2/S2' causes differential increasing and decreasing of energy stored in the first leg inductor and the second leg inductor, respectively, and common gating of the switches S1/S1' and the switches S2/S2' causes common increasing and decreasing of energy stored in the first leg inductor and the second leg inductor, respectively, and a switching signal generator for generating switching signals for driving the switches S1, S1', S2, S2' having a reference signal input and comprising A) a variable frequency carrier signal generator for generating a carrier signal with a frequency that varies over time and a plurality of comparators connected to the carrier signal and to the reference signal for comparing the reference signal to the carrier signal and having a comparison output connected to respective gates of the switches S1, S1', S2, S2' or B) a non-transitory memory storing instructions and a processor operatively connected to respective gates of the switches S1, S1', S2, S2' for generating the switching signals for driving the switches at a frequency that varies over time. When the frequency that varies over time changes from one frequency to another, a last switch gate pulse at the one frequency is a half pulse for one of the switches S1/S1' and the switches S2/S2' and a first switch gate pulse of the other frequency is a half pulse for one of the switches S2/S2' and the switches S1/S1', respectively.

In some embodiments of the proposed multi-level power converters, the switching signal generator for generating switching signals for driving the switches S1, S1', S2, S2' comprises A) a variable frequency carrier signal generator for generating a carrier signal with a frequency that varies over time and a plurality of comparators connected to the carrier signal and to the reference signal for comparing the reference signal to the carrier signal and having a comparison output connected to respective gates of the switches S1, S1', S2, S2.

In some embodiments of the proposed multi-level power converters, the switching signal generator for generating switching signals for driving the switches S1, S1', S2, S2' comprises B) a non-transitory memory storing instructions and a processor operatively connected to respective gates of the switches S1, S1', S2, S2' for generating the switching signals for driving the switches at a frequency that varies over time.

In some embodiments of the proposed multi-level power converters, the switches S1, S1', S2, S2' are wide-bandgap fast power switches operating at a frequency of over about 50 kHz.

In some embodiments of the proposed multi-level power converters, where the frequency that varies over time comprises a discrete frequency set centered around a central switching frequency varied following a finite sequence, where the finite sequence is randomly generated and periodically repeated, where the frequency that varies over time is varied after generating a number of pulses.

Some embodiments of the proposed multi-level power converters further comprise additional switches directly connected or indirectly connected to one of the pair of switches and directly connected or indirectly connected to the DC terminal or the AC terminal, where the switching signal generator is further generating switching signals for driving the additional switches.

In some embodiments of the proposed multi-level power converters, the switching signal generator can further use any pulse modulation method in order to reduce electromagnetic interference, spread the harmonic cluster of switching frequency, cancel odd multiples of switching frequency, reduce harmonic cluster frequency spikes or a combination thereof.

Some embodiments of the first multi-level power converter further comprise two capacitors, where the second end of the pair of switches S2, S2' is connected to a first end of the two capacitors and is connected to the DC terminal, where the two capacitors are connected at a second end to neutral and together.

Some embodiments of the first multi-level power converter further comprise a second point of said AC terminal connected to the first ends of two capacitors whose opposed second ends are connected to opposed polarities of said DC terminal.

In some embodiments, an embodiment of the proposed multi-level power converters is used in a five-level active neutral point clamped converter configuration, which further comprises two high-voltage capacitors and additional switches, where a first pair S3, S3' of the additional switches is connected at a first end to the second end of a first one of the pair of switches S2, S2', a second pair S4, S4' of the additional switches is connected at a first end to the second end of a second one of the pair of switches S2, S2', a second end of a first one of the first pair S3, S3' of the additional switches is connected to a first end of a first one of the two high-voltage capacitors, where the first end of the first one of the two high-voltage capacitors is further connected to the DC terminal, a second end of a first one of the first pair S4, S4' of the additional switches is connected to a first end of a second one of the two high-voltage capacitors, where the first end of the second one of the two high-voltage capacitors is further connected to the DC terminal, and a second end of a second one of the first pair S3, S3' of the additional switches and a second end of a second one of the first pair S4, S4' of the additional switches are connected together, to second ends of the two high-voltage capacitors, and to neutral.

Some embodiments of the proposed multi-level power converters can be directly or indirectly connected to at least one additional converter having at least one switch, where the switching signal generator generates switching signals for driving both the switches of the multi-level converter and the at least the one switch of the additional converter.

In some embodiments of the proposed five-level active neutral point clamped converter is a power rectifier for converting an alternative current to a direct current, where the AC terminal is an AC power input of the power rectifier and the DC terminal is a DC power output of the power rectifier.

In some embodiments of the proposed five-level active neutral point clamped converter is a power inverter for converting a direct current to an alternative current, where the DC terminal is a DC power input of the power inverter and the AC terminal is the AC power output of the power inverter.

Applicant also proposes a bidirectional back-to-back converter comprising an embodiment of a proposed five-level active neutral point clamped power inverter, an embodiment of a corresponding five-level active neutral point clamped power rectifier, where the AC power input of the power rectifier is an AC power input of the bidirectional back-to-back converter, where the AC power output of the power inverter is an AC power output of the bidirectional back-to-back converter, where a negative DC current of the DC power output of the power rectifier is connected to a negative DC current of the DC power input of the power inverter, where a positive DC current of the DC power output of the power rectifier is connected to a positive DC current of the DC power input of the power inverter, where the neutral of the power rectifier is connected to the neutral of the power inverter, and where the power rectifier and the power inverter share of the two high-voltage capacitors.

Applicant also proposes a three-phase variable frequency motor drive comprising three of a same embodiment of the proposed five-level active neutral point clamped power inverter, where a negative DC current of each one of the DC power input of the power inverters are connected in parallel, where a positive DC current of each one of the DC power input of the power inverters are connected in parallel, where the neutral of each one of the power inverters are connected in parallel, where the three of the power inverters share a common the two high-voltage capacitors and share a common the DC power input, and where the AC power output of each one of the power inverters are alternative currents phase-shifted by 120 degrees from the AC power output of each other ones of the power inverters.

Applicant also proposes a three-phase variable frequency motor drive comprising three of a same embodiment of the proposed bidirectional back-to-back converter, where each one of the negative DC current of the three of the bidirectional back-to-back converters are connected in parallel, where each one of the positive DC current of the three of the bidirectional back-to-back converters are connected in parallel and where each one of the neutral of the three of the bidirectional back-to-back converters are connected in parallel, where the three of the bidirectional back-to-back converters share commons the two high-voltage capacitors, and where the power AC power output of each one of the three of the bidirectional back-to-back converters are alternative currents phase-shifted by 120 degrees from the AC power output of each other ones of the three of the bidirectional back-to-back converters.

In some embodiments of the proposed three-phase variable frequency motor drive, the switches of the three-phase variable frequency motor drive are driven by a common switching signal generator.

Applicant further proposes a modulation method for power conversion using a multi-level power converter having at least one energy balancing component, which includes: generating switching signals for driving power switches of a multi-level power converter connected to the at least one energy balancing component at a frequency that varies over time to reduce electromagnetic interference of the multi-level converter, where, when the frequency that varies over time changes from one frequency to another frequency, a last switch gate pulse at the one frequency is a half pulse for at least one of the power switches and a first switch gate pulse of the other frequency is a half pulse for at least one other one of the power switches respectively, to balance stored electric energy of the at least one energy balancing component.

In some embodiments of the proposed method, the frequency that varies over time is repeated a fixed number of times, that is at least two times before being changed to the other frequency.

In some embodiments of the proposed method, the frequency that varies over time changes from the one frequency to the other frequency to perform random pulse width modulation. In some of these embodiments, the frequency that varies over time, the one frequency and the other frequency are selected from a discrete frequency set centered around a central switching frequency. In some of these embodiments, changing the one frequency to the other frequency is following a finite sequence that is randomly generated and periodically repeated.

In some embodiments of the proposed method, the switching signals is generated by comparing a reference signal to a triangular periodic signal having a frequency of the frequency that varies over time, where the last switch gate pulse and first switch gate pulse are generated by phase shifting the triangular periodic signal by $(2N-1)\pi$ radians (i.e., 180°, half a period), or, in other words, flipping around the horizontal axis (upside-down) when changing the frequency that varies over time.

In some embodiments of the proposed method, the at least one energy balancing component is at least one flying capacitor, where the balancing of the stored electric energy reduces high-frequency voltage ripples of a voltage of the flying capacitor.

In some embodiments of the proposed method, the at least one energy balancing component is at least a pair of leg inductors, where each one of the pair of leg inductors are connected to a different pair of switches and where the balancing of the stored electric energy reduces the amplitude of current variations in the leg inductors.

BRIEF DESCRIPTION OF THE DRAWINGS

The invention will be better understood by way of the following detailed description of embodiments of the invention with reference to the appended drawings, in which.

DETAILED DESCRIPTION

As fast switches, such as silicon carbide (SiC) or gallium nitride (GaN) switches are becoming more affordable, more and more power electronics apparatuses are now using fast switches in order to improve efficiency and reduce switching losses. However, replacing standard switches with these faster SiC and GaN switches cause significantly higher electromagnetic interference (EMI). To prevent further requiring an enlarged and redesigned EMI filter, techniques of random pulse-width modulation (PWM) have been developed to spread the harmonic cluster of switching frequency ($f_{sw}$) to adjacent frequencies, thus reducing the emanated EMI. However, the use of such PWM methods, such as the random PWM (RPWM) for example, can lead to an unbalance of the stored electric energy of the energy storing components of the converters. The energy storing components of the converters can be used to balance the energy across some of the switches, which are therefore referred to as an energy balancing component. The imbalance of stored electric energy in the energy balancing component can lead to an imbalance of the voltage of the flying capacitor in flying capacitor-based converters and can lead to non-equal current distribution between the leg inductors in the parallel converters with leg inductors.

For example, in the case where the energy balancing components is a flying capacitor, such PWM methods increases both the high and low-frequency voltage ripple (LFVR) of the flying capacitor (FC) of the multilevel converter (MLC). These greater voltage ripples are not normally dealt with and the MLC therefore requires the use of a higher value FC which can increase the size, weight and cost of the converter in addition to reducing efficiency.

The applicant has developed a pulse width modulation method for generating the switching signals with variable frequencies for a converter's high-frequency switches that can better balance some energy balancing components of the MLC. For example, this can result in a balancing of the flying capacitor's voltage to reduce its high-frequency voltage ripples for flying-capacitor-based converters or can result in a balancing of the current of the inductors of a three-level (3L) parallel converters.

Applicant has found a method for generating switching signals to balance the charging and discharging of the FC as to reduce its voltage ripples and is thus able to create more efficient MLCs, while still significantly reducing EMI and noise.

Figures 1, 2:
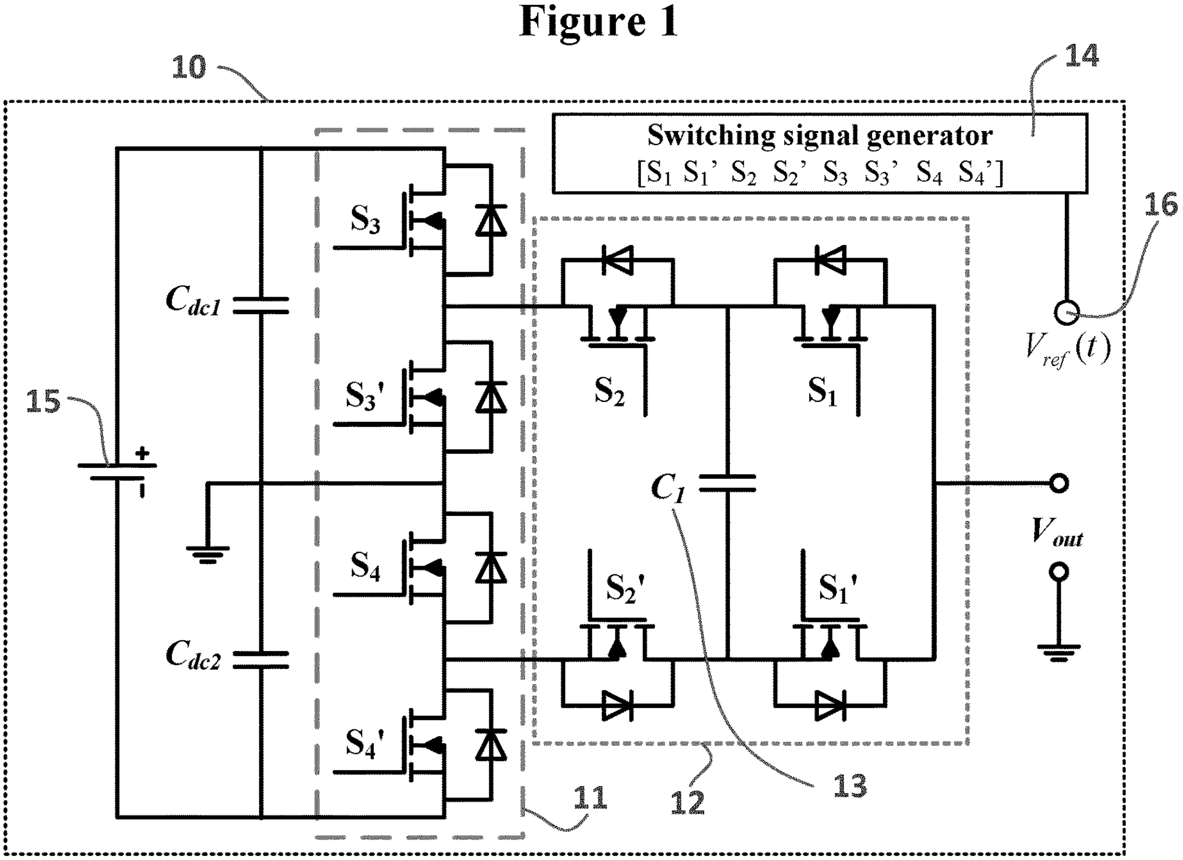
FIG. 1 is a schematic illustration of a five-level active neutral point clamped (5L-ANPC) converter, where its switches are controlled with the signal of the switching signal generator.
FIG. 2 is a table of switching states of the 5L-ANPC converter presenting the associated output voltages and the states for charging/discharging the various capacitors.

For better understanding, let us consider an exemplary embodiment of converter having a flying capacitor (FC) as an energy storing component as illustrated in FIG. 1. FIG. 1 presents a schematic illustration of an embodiment of a hybrid flying capacitor based MLC, more specifically a five-level active neutral point clamped (5L-ANPC) converter provided with a DC power supply 15 of voltage E. In other embodiments, MLCs are alternative derived hybrid configurations of the 5L-ANPC 10 comprising a DC-link capacitor regulated to E/2, a high-frequency FC cell 12 ($S_1$, $S'_1$, $S_2$ and $S'_2$) and a low-frequency voltage doubler cell 11 ($S_3$, $S'_3$, $S_4$ and $S'_4$). The various switches of the MLC are controlled with the switching signals delivered by the switching signal generator 14 in response to a reference voltage ($V_{ref}$) 16, which can be implemented digitally, analogically or with a combination thereof. In some embodiments, only some switches are fast power switches, while in some other embodiments all of the switches are fast power switches. In this embodiment, the high-frequency cell is comprising a FC 13 regulated to E/4 and a first set of four fast power switches (SiC and/or GaN switches). This 5L-ANPC converter is used to generate five output voltage levels $V_{out}$ as a function of the eight possible switching states $S_n$ as presented in the table of FIG. 2. In this embodiment, utilizing the possible redundant switching states allows to regulate the FC without using any voltage sensor or closed-loop voltage regulator and to generate five various output voltages ($V_{out}$): 0, ±E/4 or ±E/2 voltage levels. FIG. 2 also indicates the charging (↑) and discharge (↓) states of the DC capacitors ($\Delta R_{Cfc}$) and of the energy balancing element, which in this embodiment is the flying capacitor ($\Delta E_{Cdc}$), for each of the switching state and output voltages. The frequency of switching in the range of 10 kHz to 30 kHz in a MLC can be considered to be efficient for silicon-based slower switches, while the frequency of switching can be increased to be above 50 kHz to over 100 kHz for fast power switches. Such higher frequency can reduce the size of the flying capacitors and/or inductors in the MLC and improve efficiency. The effect of faster switches and higher frequency is to increase switching noise, namely EMI noise in the MLC output.

In order to reduce the FC's voltage ripples, the imbalance of the charging and discharging state must be minimized at all times, which can be achieved by balancing the width of the active time for the switching states of the high-frequency cell 12 responsible for charging and discharging of the FC. As illustrated in FIG. 2, the embodiment's FC 13 is solicited when only one of the fast switches $S_1$ or $S_2$ is active (differential gating), meaning that the charge on the FC is kept constant when both of them are in the same state. However, the task of balancing the pulse width of the high-frequency cell switches can often become a much-complicated task when employing complex PWM methods within MLCs, especially when employing random PWM methods.

Random modulation schemes for generating PWM switching signals of switches of the converter can involve comparing reference signals to carrier signals with randomized switching frequency or randomized pulse positions. This can be used for common random modulation schemes such as random pulse-position modulation (RPPM) and/or random pulse-width modulation (RPWM) and/or random carrier-frequency modulation with a fixed duty cycle (RCFMFD), etc.

Figure 5:
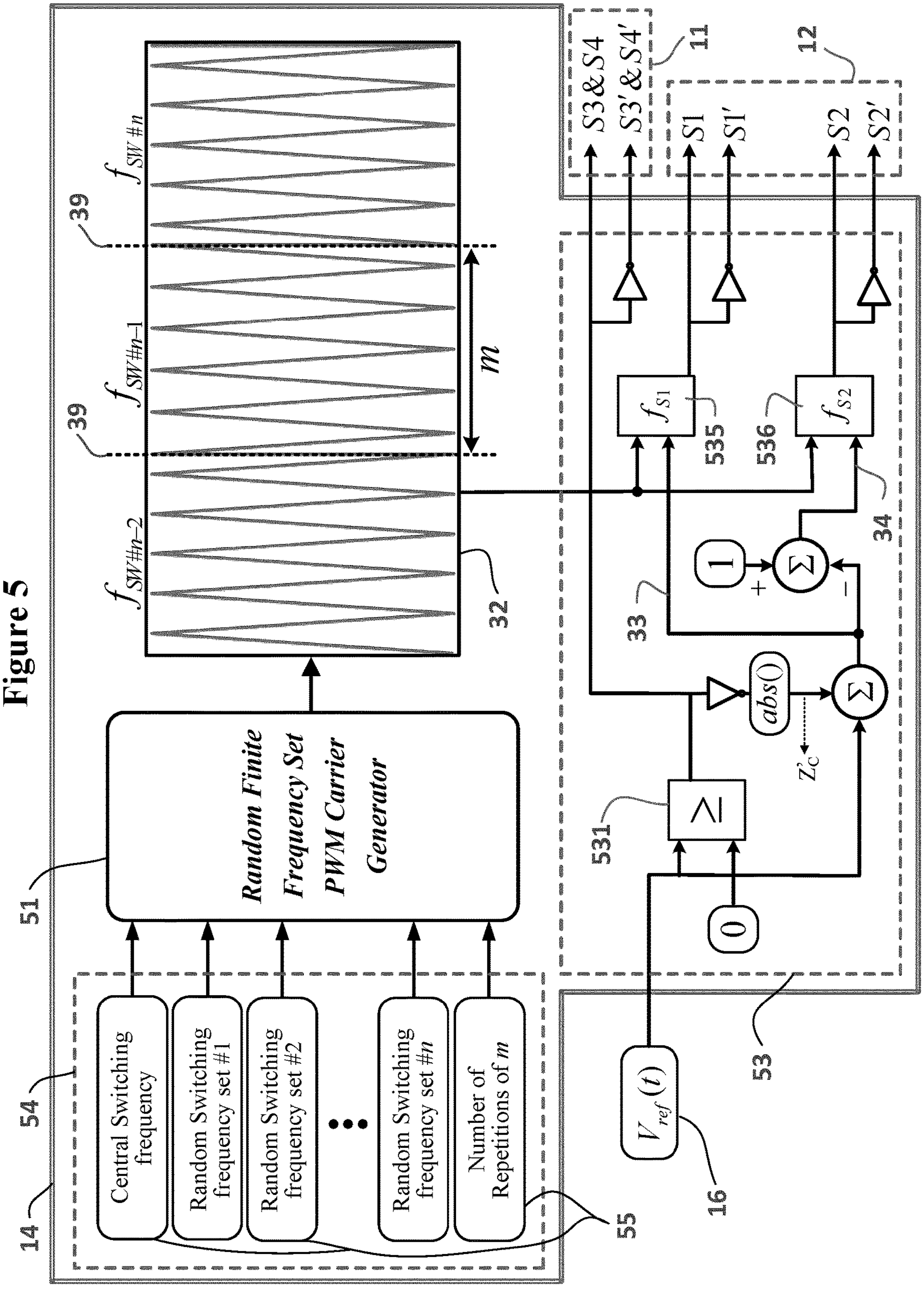
FIG. 5 illustrates the schematic diagram of a switching signal generator for generating a single-carrier logic equation-based switching signals that can respect the random finite frequency set PWM (RFFS-PWM) method for the 5L-ANPC converter.

To better understand the relation of the carrier signal (Crr) and $V_{ref}$ for generating switching signals, refer to FIG. 5 illustrating an embodiment a switching signal generator 14, where a carrier signal 32 generated by a carrier signal generator 51 is compared with the reference signal 16 through a logic equation-based comparator 53 in order to generate the switching signals for the switches of both the low-frequency cell 11 and the high-frequency cell 12. It will be appreciated that carrier signal generator 51 can be configured to utilize a set of stored/integrated values and functions 54 that can include various functions 55, which may be central switching frequencies, random switching frequencies and numbers of repetitions (m). In the non-limiting embodiment of FIG. 5, the comparing blocs $f_{s1}$ 535 and $f_{s2}$ 536 are comparing modified reference signals ($V_{Ref,1}=Z'_c+V_{Ref}$) 33, where $Z'_c=1$ when $V_{Ref}<0$ or else is zero, and ($V_{Ref,2}=1-V_{Ref,1}$) 34 with the Crr 32 to generate the switching signals for the switches $S_1$ and $S_2$, respectively. Where the comparing process of the comparing blocs $f_{s1}$ 535 and $f_{s2}$ 536 of this embodiment can respect the following logic equations (1) and (2), respectively.

$$S_1 = \begin{cases} 1, & V_{Ref,1} \geq Crr \\ -1, & V_{Ref,1} < Crr \end{cases} \tag{1}$$

$$S_2 = \begin{cases} 1, & V_{Ref,2} \leq Crr \\ -1, & V_{Ref,2} > Crr \end{cases} \tag{2}$$

Figure 3A:
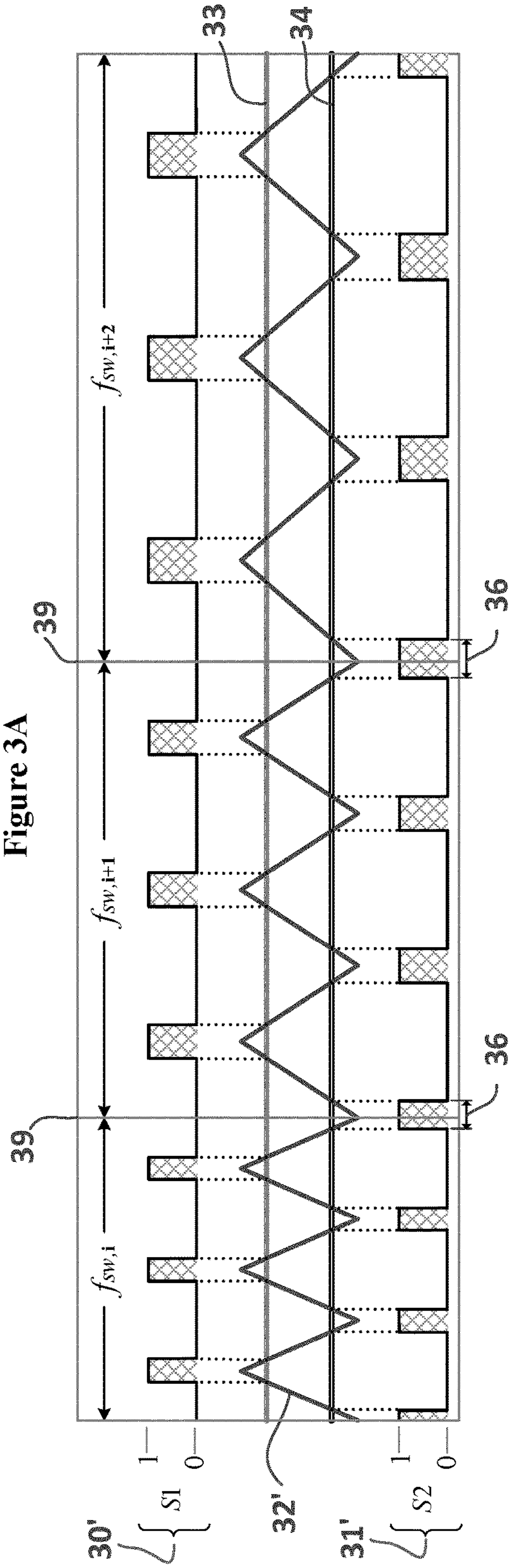
FIG. 3A illustrates switching signals for a high-frequency cell of a MLC generated by comparing reference signals to a carrier signal (m=3).

FIG. 3A illustrates exemplary switching signals 30' and 31' for the high-frequency cell of the 5L-ANPC generated by comparing Crr 32' to the reference signals $V_{Ref,1}$ 33 and $V_{Ref,2}$ 34 for the switches $S_1$ and $S_2$, respectively. In the embodiment of FIG. 3A, the switching signals are a result of a proposed pseudorandom binary sequence generator, for generating a finite quantity of random values used to select the following/adjacent frequency ($f_{sw,i+1}$) out of a finite switching frequency variation band which reduces the switching losses, where the switching frequencies ($f_{sw,i}$) are repeated three times (m=3) before changing to $f_{sw^{i+1}}$. The full transition pulses 36 (around the change between two different $f_{sw}$ 39), having a width larger than the preceding pulse and smaller than the following one, cause an imbalance of the charging/discharging of the FC over time when repeated and applied only to some of the switches (to $S_2$ in this example). In this setup, the switching signal $S_1$ does not have any transition pulse inducing an imbalance with $S_2$ when charging and discharging the FC.

Figures 4A, 4B:
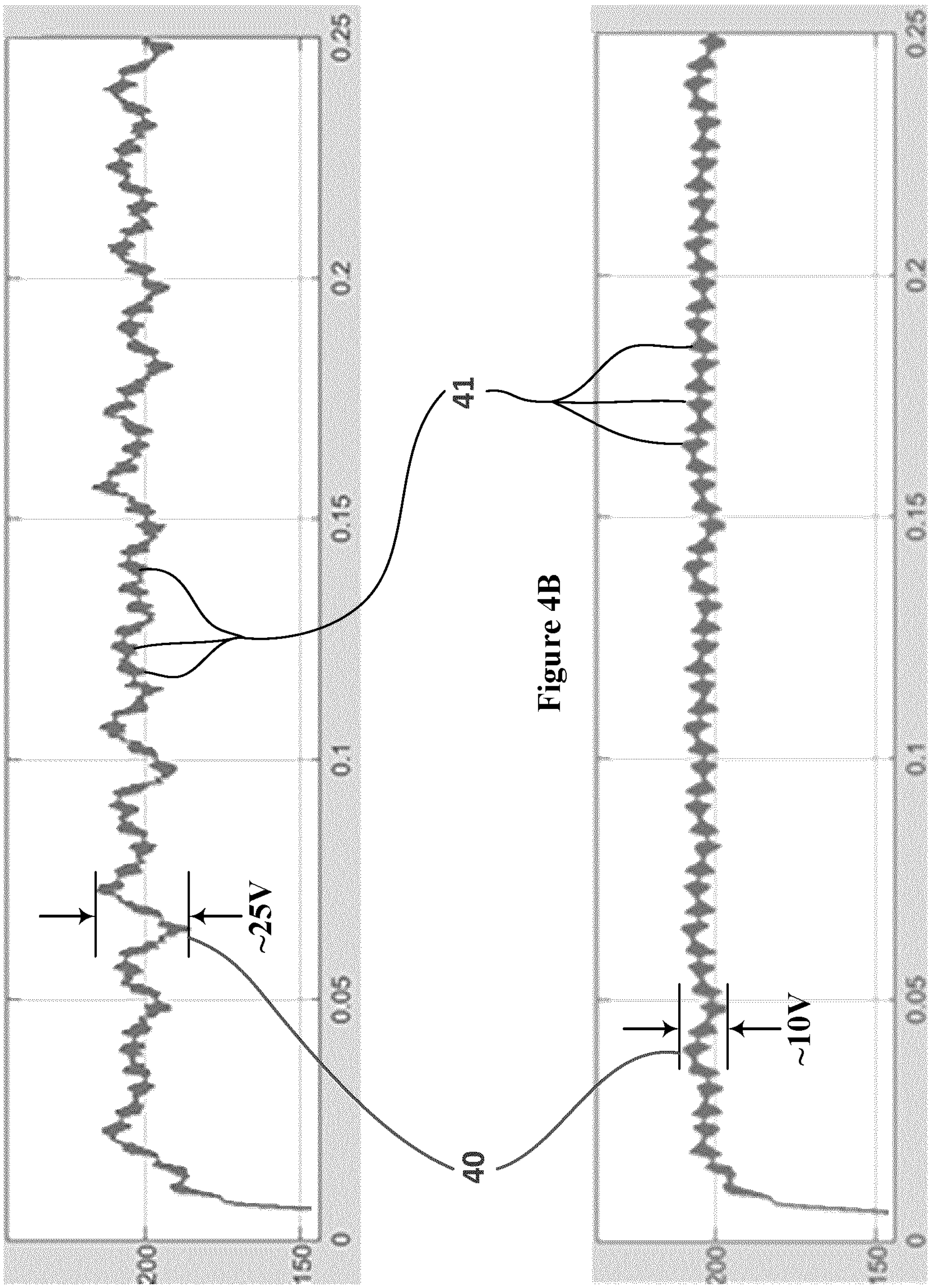
FIG. 4A shows the flying capacitor voltage of a 5L-ANPC when employing a carrier signal (n=4, m=5, $f_{sw}$=110 kHz and step=10k Hz) RFFS-PWM schemes without reduction of the FC high-frequency ripples.
FIG. 4B shows the flying capacitor voltage of a 5L-ANPC when employing the same set of RFFS-PWM schemes but using a proposed novel carrier signal (n=4, m=5, $f_{sw}$=110 kHz and step=10 kHz) to reduce the FC high-frequency ripples.

In fact, this imbalance is responsible for inducing the above-mentioned low-frequency voltage ripple (LFVR) 40 of the FC 13 seen on the experimental curve of the FC voltage as of function of time presented in FIG. 4A. The high-frequency voltage ripples of the FC identified as 41, are caused by the logic equation of the comparator and are of reasonably low intensity.

Identifying the specific source of the LFVR is part of the solution allowing to develop a new method for generating the carrier signal. Applicant has found that the LFVR can be suppressed up to about 60% with this new method that manages the pulses of the high-frequency cell's switches around each of the switching frequency change 39 ($f_{sw_i}$ to $f_{sw_{i+1}}$). The switching signal generator can be used to generate a switching signal that induces half a pulse for one of the charging/discharging states before the switching frequency is varied and induces half a pulse for the corresponding one of the discharging/charging states (opposed state) after the switching frequency is varied.

Figure 3B:
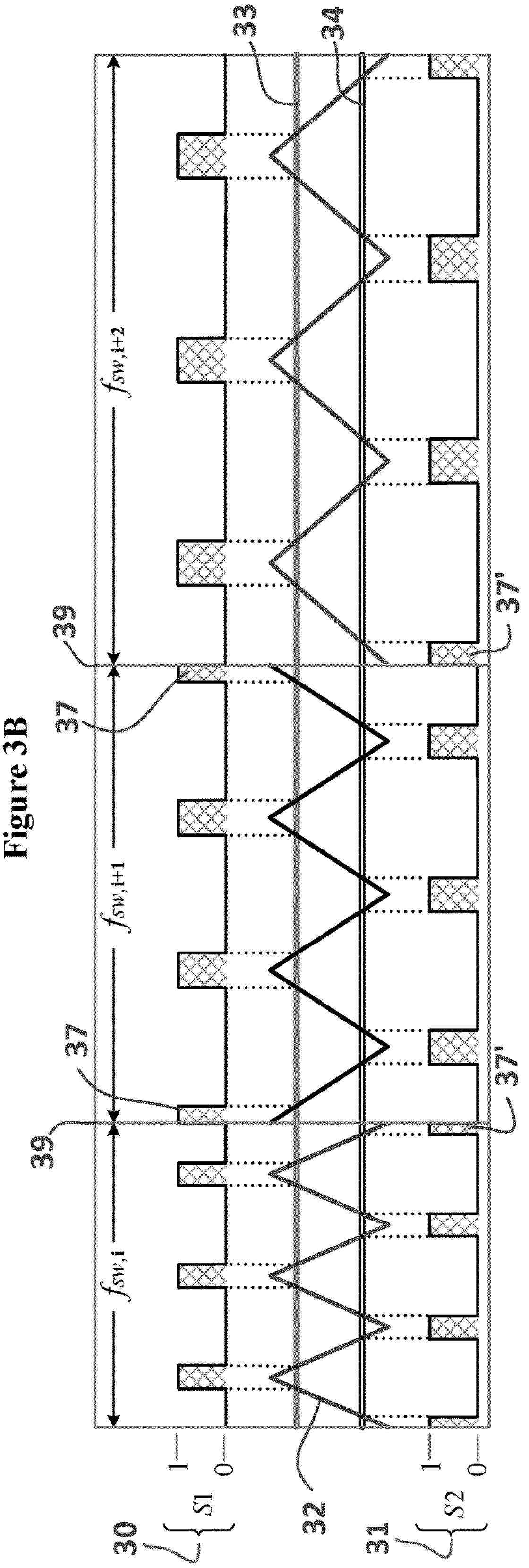
FIG. 3B illustrates switching signals for a high-frequency cell of a MLC generated by comparing a novel carrier signal (m=3) to reference signals.

In the embodiments presented above and all embodiments comprising a carrier signal, the method can include phase shifting the following set of switching frequency ($f_{sw_{i+1}}$) by (2N−1)π radians (i.e., 180°, half a period), or, in other words, flipping around the horizontal axis (upside-down) the Crr each time the switching frequency is changed. This results in the alternative and novel carrier signal 32 illustrated in FIG. 3B, which depicts exemplary switching signals 30 and 31 for the high-frequency cell of the 5L-ANPC generated by comparing the novel Crr 32 to the reference signals $V_{Ref,1}$ 33 and $V_{Ref,2}$ 34 (the same reference signals as FIG. 3A) for the switches $S_1$ and $S_2$, respectively respecting the logic equations (1) and (2). This allows to symmetrically balance the charging and discharging of the flying capacitor by inducing half a switch pulse in the charging ↑ or discharging ↓ state (see FIG. 2 for specific states of the presented embodiment) before the switching frequency change 39 and half a switch pulse in the opposite state (discharging ↓ or charging ↑, respectively). In other words, this method equally imposes and distributes half transition pulses (37 and 37') to the charging and discharging states.

The resulting experimental curve of the FC voltage as of function of time presented in FIG. 4B shows a reduction of about 15 volts (60%) of the LFVR 40 from the conventional carrier signal illustrated in FIG. 4A (from about 25 volts to about 10 volts) when using the novel carrier signal.

While the presented carrier signal 32 is illustrated as the preferred embodiment of a triangular wave, but one skilled in the art will appreciate that Crr 32 can take the form of a left or right sawtooth wave or any triangular shape in between. While not being limited by the following, this method is most useful when used in combination with frequency modulation schemes for the switching signals of the switches in most of the converters (rectifiers, regulators, inverters, converters, two-level converters, three-level converters, five-level converters, etc.) comprising an energy storing element (e.g., flying capacitor, leg inductor), acting as an energy balancing component, connected with at least some of the switches, since these frequency modulation schemes can cause unbalanced charging and discharging of the energy storing element of the converters.

In some of the preferred embodiments of the flying capacitor-based converters, switches can cause charging or discharging of the FC when differentially gated (half of the switches are active while their respective opposed corresponding switch is inactive). An uneven switching of the switches that can result from the frequency modulation schemes currently used, in the state of the art, for the switching signals of the switches can therefore induce an imbalance of the charging/discharging of the stored electrical energy (e.g., the voltage of the flying capacitor). The proposed PWM method can reduce this imbalance of the stored electrical energy in the energy storing/balancing elements of converters.

Exemplary MLC Switching Signal Generator

The embodiment of a 5L-ANPC illustrated in FIG. 1, can have a switching signal generator illustrated in FIG. 5 as a schematic diagram of a proposed random finite frequency set (RFFS) PWM for the 5L-ANPC converter. As shown in FIG. 5, the proposed RFFS-PWM can be divided to the two following main submodules: the RFFS-PWM carrier generator 51 for generating the proposed symmetrical charge/symmetrical discharge carrier signal of the RFFS-PWM method 32 with the variable inputs 54; and a logic equation-based comparator cell 53, to compare the carrier signal 32 with the reference signal 16.

Figure 6A:
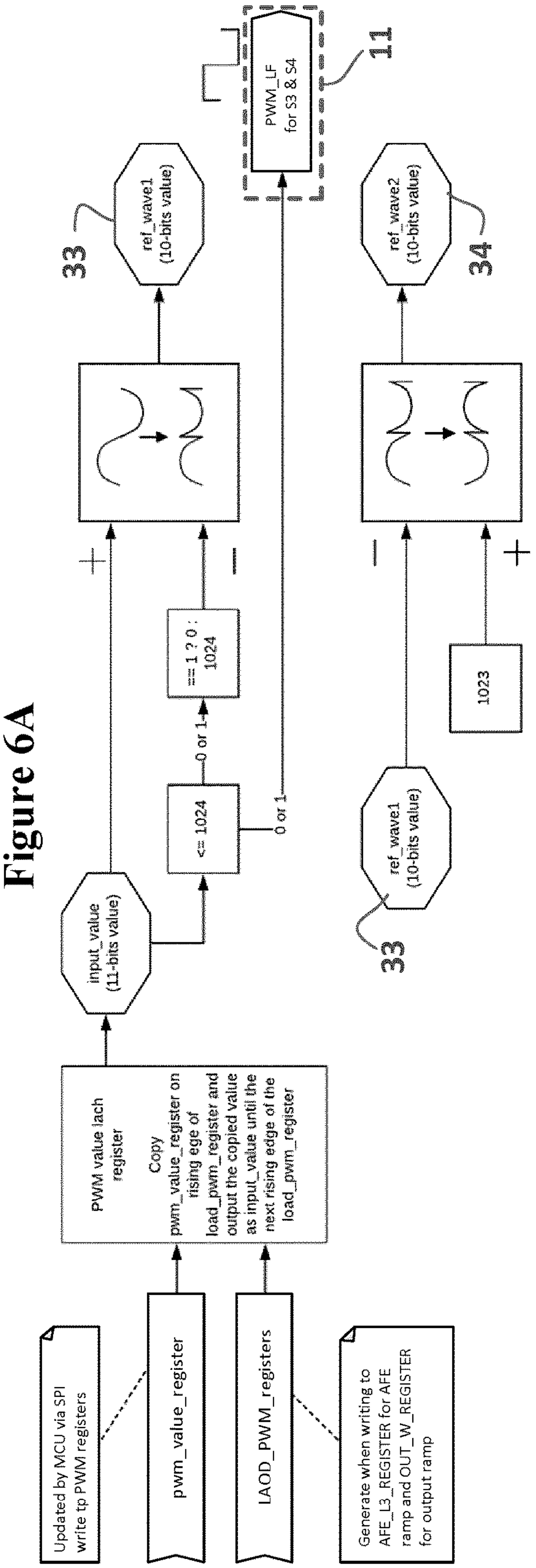
FIG. 6A shows a block diagram of a digital embodiment of part of the comparator of the switching signal generator.
Figure 6B:
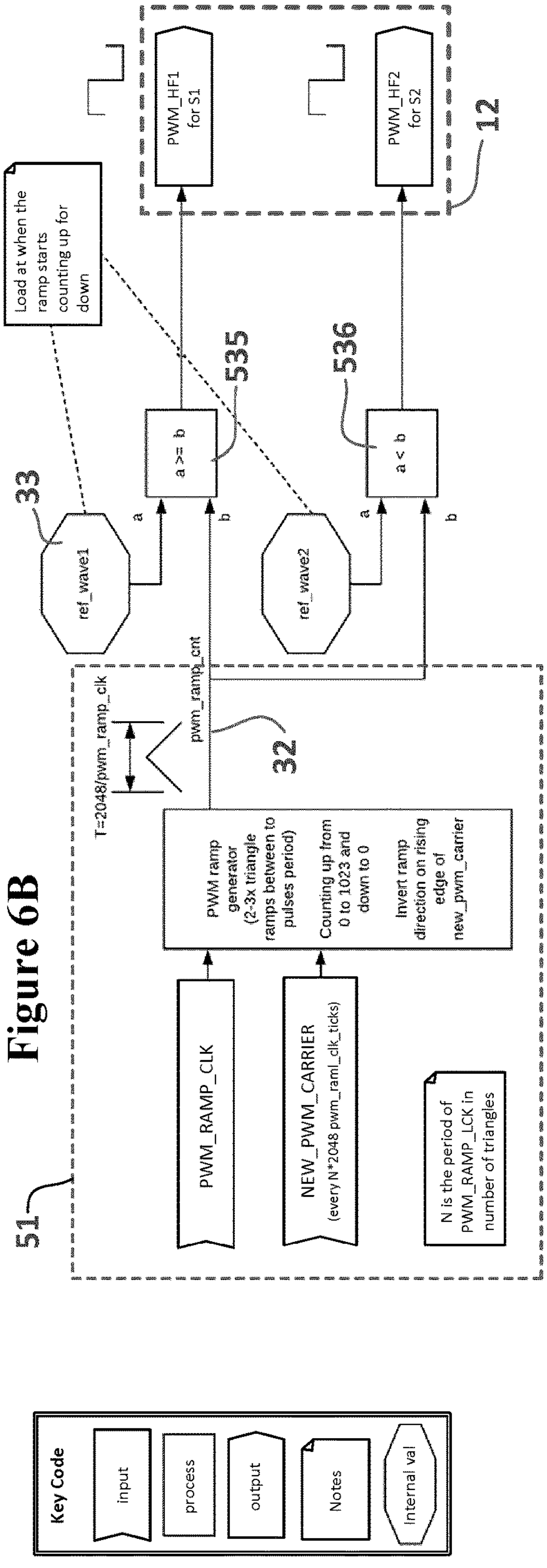
FIG. 6B shows a block diagram of a digital embodiment of the carrier signal generator and another part of the comparator of the switching signal generator.

As someone skilled in the art would know, both of these submodules can be analog or digitally implemented with one or more processors (microprocessor, digital signal processor, field-programmable gate array (FPGA) and/or others). They can be separately programmed or integrated together. In some embodiments, a carrier signal generator is integrated into an FPGA (with defined switching frequency variation update rates and a list of all $f_{sw}$) for generating a RFFS-PWM Crr is working with at least one comparator programmed in a microprocessor having this Crr and a reference signal as inputs. In some embodiments, the FPGA is programmed so that the $f_{sw}$ is selected by following a pseudorandom binary sequence that signals a triangular signal generator module to generates a period with the selected frequency (by controlling the triangular signal generator module's internal counter or clock) repeated m times and that also signals the triangular signal generator module to phase shift the next period by (2N−1)π radians (i.e., 180°) when the changing $f_{sw}$. FIG. 6A presents the block diagram of a digital embodiment of the comparator of the switching signal generator for generating $V_{Ref,1}$ 33, $V_{Ref,2}$ 34 and switching signal for the LF cell 11. FIG. 6B shows a block diagram of the same digital embodiment of the carrier signal generator 51 and another part of the comparator for comparing Crr 32 to the modified reference signals $V_{Ref,1}$ 33 and $V_{Ref,2}$ 34 of FIG. 6A to generate the switching signals of the HF cell 12.

In some similar or analogue embodiments, the switching signals can be partially or completely generated via software by referring to a readable non-transitory memory storing one or a list of multiple (up to many gigabytes of data) predetermined sequences of modulated pulse width simulating the required level of randomness that can be adapted to a reference signal and repeated as many times as possible. For example, a switching signal predetermined to be a pseudorandom sequence (for reducing noise and losses and improving the efficiency of the converter) for generating at least one full AC period can be repeated as many times as needed.

In this embodiment, the RFFS-PWM carrier generator 51 submodule generates n number of switching frequency sets with symmetrical distribution around the central switching frequency of $f_{sw}$. To attain symmetrical switching harmonic cluster distribution around the central switching frequency of $f_{s2}$, n may be selected as an even number. The bandwidth of switching frequency variation ($BW_{sw}$) between two adjacent switching frequencies of $f_{sw_{\#k}}$ and $f_{sw_{\#k+1}}$ may be defined in a way that maximum continuous switching frequency harmonic distribution can be achieved. So, the $BW_{sw}$ can be defined by the equation (3), where k∈[1; n−1].

$$BW_{sw} = \begin{cases} \dfrac{f_{sw_{\#k+1}} - f_{sw_{\#k}}}{2}, & k = \dfrac{n}{2} \\ f_{sw_{\#k+1}} - f_{sw_{\#k}}, & k \neq \dfrac{n}{2} \end{cases} \tag{3}$$

The $BW_{sw}$ may be selected based on the desired band of the interest defined by the relevant standards. The random switching between the frequencies of the finite switching frequency set (around central switching frequency) is controlled by referring to and employing a finite set of random values generated with a pseudorandom binary sequence generator with a bandwidth of switching variation that can be $BW_{sw}$.

The number of repetitions 55 can be defined as the switching frequency variation update rate (m). The switching pattern of the novel proposed carrier signal 32 is presented in FIG. 5. As depicted, the switching frequency $f_{sw}$ can be updated to a next switching frequency selected out of a finite list of n numbers of $f_{sw}$ with a value selected from the pseudorandom binary sequence. By employing this technique in this embodiment of the proposed RFFS-PWM method, the average value of switching loss of the converter can be approximately equal to that value of the standard constant switching frequency PWM techniques. Regarding other introduced RPWM techniques, it is worth mentioning that without utilizing this technique, the switching loss of the converter can be increased, and its value can be higher than that value by employing the constant switching frequency PWM techniques. Hence, by applying the number of repetitions (m) 55 to the submodule 51, the efficiency of the converter may be increased in comparison to other RPWM methods.

In order to achieve sensor-less voltage balancing of the FC in the 5L-ANPC and 3L-FC MLCs, the charge/discharge period of the FC should be balanced in each switching period. Balancing the charge/discharge period is difficult to fulfill in random pulse position RPWM methods due to the fast variation of pulse position or duty cycle. Similarly, as previously described and illustrated in FIG. 3A, due to the fast variation of the switching frequency $f_{sw}$ in dithering technique (based on changing the switching frequency without manipulating the pulse position in RPWM techniques), it is difficult to balance charge/discharge period in each switching period. This leads to an increased value of required FC and increased voltage ripple of the FC. In order to solve this issue, the applicant uses the novel symmetrical charge/symmetrical discharge method to generate a carrier signal 32 similar to the one illustrated in FIG. 3B. The charge/discharge period of the FC is balanced in each switching period by employing this proposed PWM method. As illustrated, the FC charge/discharge period is balanced in each m=3 repetitions of switching periods as an auxiliary FC voltage balancing. Therefore, there are two sensor-less FC voltage balancing algorithms in this embodiment of the proposed RFFS-PWM method. The first one can be utilized in the logic equation-based single-carrier PWM which balances the FC voltage in each switching period and the second one can be the $(2N-1)\pi$ radians phase shift of the carrier signal when changing switching frequency which balances the FC voltage in each m repetition.

The schematic diagram of the hybrid single-carrier sensor-less PWM method for the 5L-ANPC MLC with capacitors and a self-voltage balancing comparator cell 53 is also presented in FIG. 5. It is comprising one PWM carrier signal (Crr) and two logic equations to generate PWM signals for the 5L-ANPC inverter. In this embodiment of the introduced hybrid single-carrier PWM method; $S_3$, $S'_3$, $S_4$ and $S'_4$ are considered as one low-frequency (LF) cell 11 whereas $S_1$, $S'_1$, $S_2$ and $S'_2$ are considered as one high-frequency (HF) cell 12, as illustrated in FIG. 1. In the embodiment of FIG. 5, a simple zero-crossing comparator 531 is used with a reference signal $V_{ref}$ (16) to generate the symmetric and equal switching signals ($S_3$, $S'_3$, $S_4$ and $S'_4$) for the low-frequency cell 11 in one fundamental period, wherein $S_3=S_4=1$ when $V_{ref}\geq 0$ and $S_3=S_4=0$ when $V_{ref}<0$. In this embodiment, the modified reference voltage 33 $V_{Ref,1}$ is compared to the Crr by the logic functions 535 and 536 in order to provide the PWM switching signals ($S_1$, $S'_1$, $S_2$ and $S'_2$) for the high-speed switches of the high-frequency cell 12.

Figure 7A:
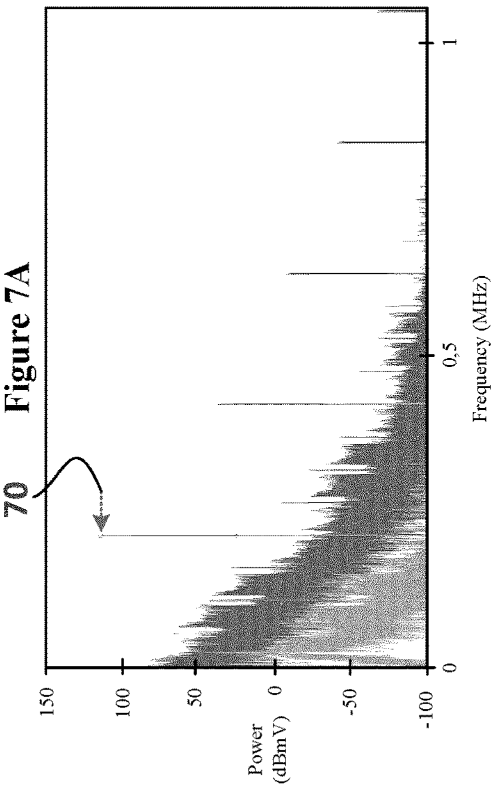
FIG. 7A shows the harmonic spectrum of the output of the 5L-ANPC converter by applying the constant switching frequency single-carrier PWM method with the switching frequency of $f_{sw}$=105 kHz.
Figure 7B:
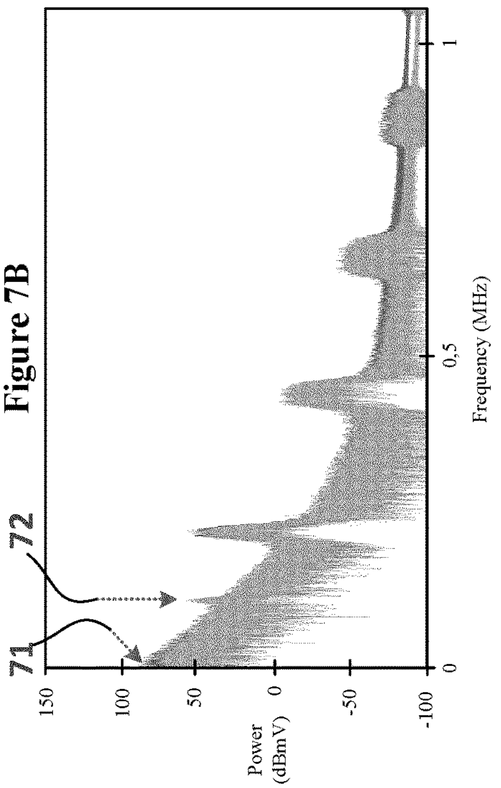
FIG. 7B presents the harmonic spectrum of the output of the 5L-ANPC converter by applying the conventional random PWM method with the switching frequency around $f_{sw}$=105 KHz.
Figure 8A:
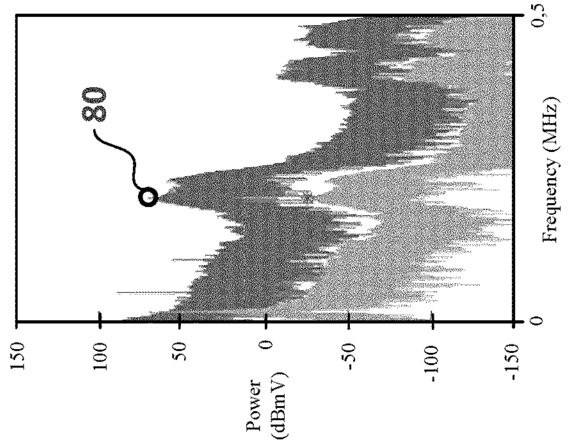
FIG. 8A presents the emanated EMI of the 5L-ANPC by applying the proposed method with the central switching frequency of $f_{sw}$=110 kHz, finite frequency sets of n=4 with a step of 5 kHz and a number of repetitions of m=5.
Figure 8B:
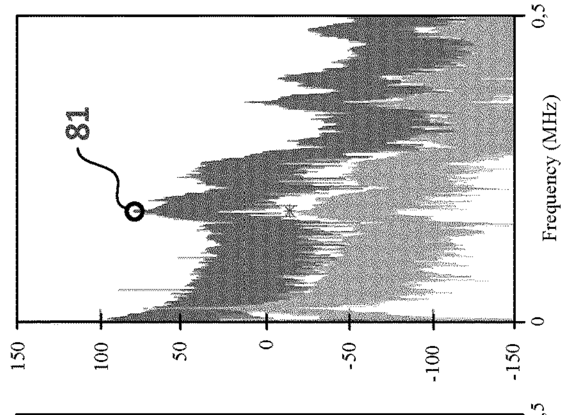
FIG. 8B presents emanated EMI of the 5L-ANPC by applying the proposed method with the central switching frequency of $f_{sw}$=110 kHz, a finite frequency set of n=4 with a step of 10 kHz and a number of repetitions of m=5.
Figure 8C:
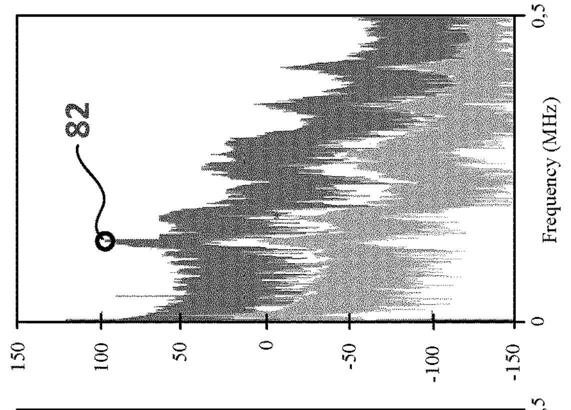
FIG. 8C presents emanated EMI of the 5L-ANPC by applying the proposed method with the central switching frequency of $f_{sw}$=110 kHz, a finite frequency set of n=4 with a step of 20 kHz and a number of repetitions of m=5.
Figure 8D:
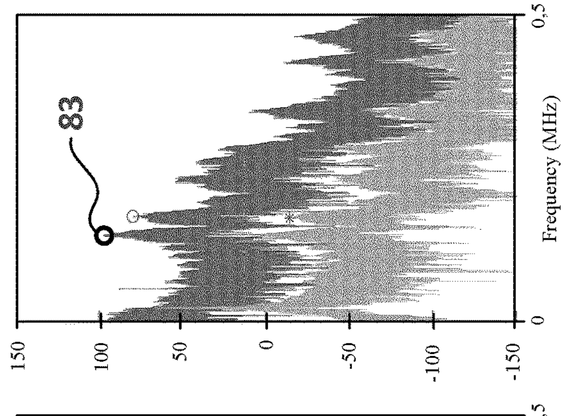
FIG. 8D presents emanated EMI of the 5L-ANPC by applying the proposed method with the central switching frequency of $f_{sw}$=100 kHz, a finite frequency set of n=4 with a step of 15 kHz and a number of repetitions of m=5.

FIG. 7A shows the harmonic spectrum (the light gray is the common-mode noise and the darker gray is the differential noise) of the output of an embodiment of the 5L-ANPC converter by applying the constant switching frequency single-carrier PWM method with the switching frequency of $f_{sw}$=105 kHz. In this embodiment, the multiples of the switching frequency are canceled out at the output of the 5L-ANPC and the first switching harmonic cluster frequency is shifted to twice of the switching frequency, but the needle type harmonic cluster spikes are still present at even multiples of $f_{sw}$ and the maximum peak value of emanated EMI 70 is around 130 dBμV. FIG. 7B presents the harmonic spectrum (the light gray is the common-mode noise and the darker gray is the differential noise) of the output of a similar embodiment of the 5L-ANPC converter using the conventional RPWM method with the same switching frequency of $f_{sw}$=105 kHz, where the peak value of emanated EMI 71 is around 80 dBμV and where the odd multiples of the switching frequency are not yet canceled out since the first switching harmonic cluster 72 is at $f_{sw}$ (105 kHz) instead of double its value (210 kHz), hence the values of the required output passive filters are significantly increased.

FIGS. 8A, 8B, 8C and 8D present the emanated EMI (the light gray is the common-mode noise and the darker gray is the differential noise) of an embodiment of the 5L-ANPC by applying the proposed method with the central switching frequency of $f_{sw}$=110 kHz, a number of repetitions of m=5 and a finite frequency set of n=4 with alternative step values. The finite frequency steps value is of 5 kHz (100 kHz, 105 kHz, 110 kHz, 115 kHz and 120 kHz) in FIG. 8A, 10 kHz (90 kHz, 100 kHz, 110 kHz, 120 kHz and 130 kHz) in FIG. 8B, 20 kHz (70 kHz, 90 kHz, 110 kHz, 130 kHz and 150 kHz) in FIG. 8C and 15 kHz with $f_{sw}$=100 kHz (70 kHz, 85 kHz, 100 kHz, 115 kHz and 130 kHz) in FIG. 8D. The experiment results for the alternative finite frequency steps, the first and odd multiples of the switching harmonic clusters are canceled out and the peak value of EMI (all associated with the differential mode noise) is around 80 dBμV 80, 79.9 dBμV 81, 98.5 dBμV 82 and 97.5 dBμV 83, respectively. The pulse width modulation methods can be and are not limited to random pulse width modulation, random carrier-frequency modulation, random finite frequency set or a combination thereof.

Figure 9A:
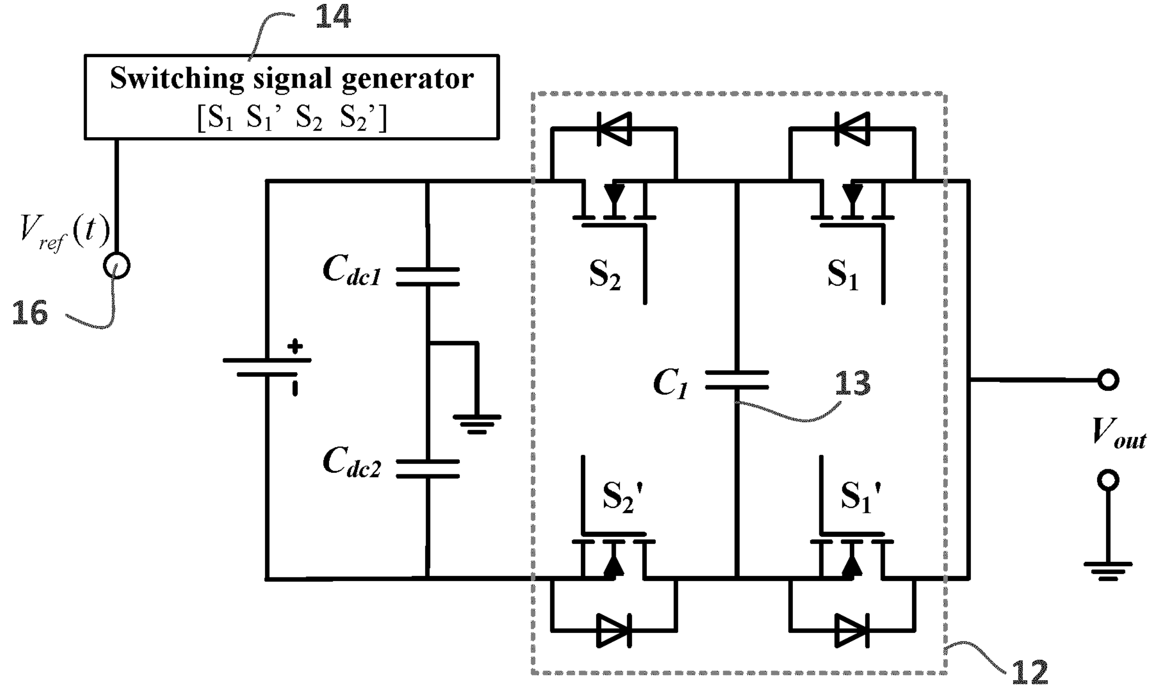
FIG. 9A shows a schematic illustration of a three-level flying capacitor converter (3L-FC) in a power inverter configuration, where its switches are controlled with the signal of the switching signal generator.
Figure 9B:
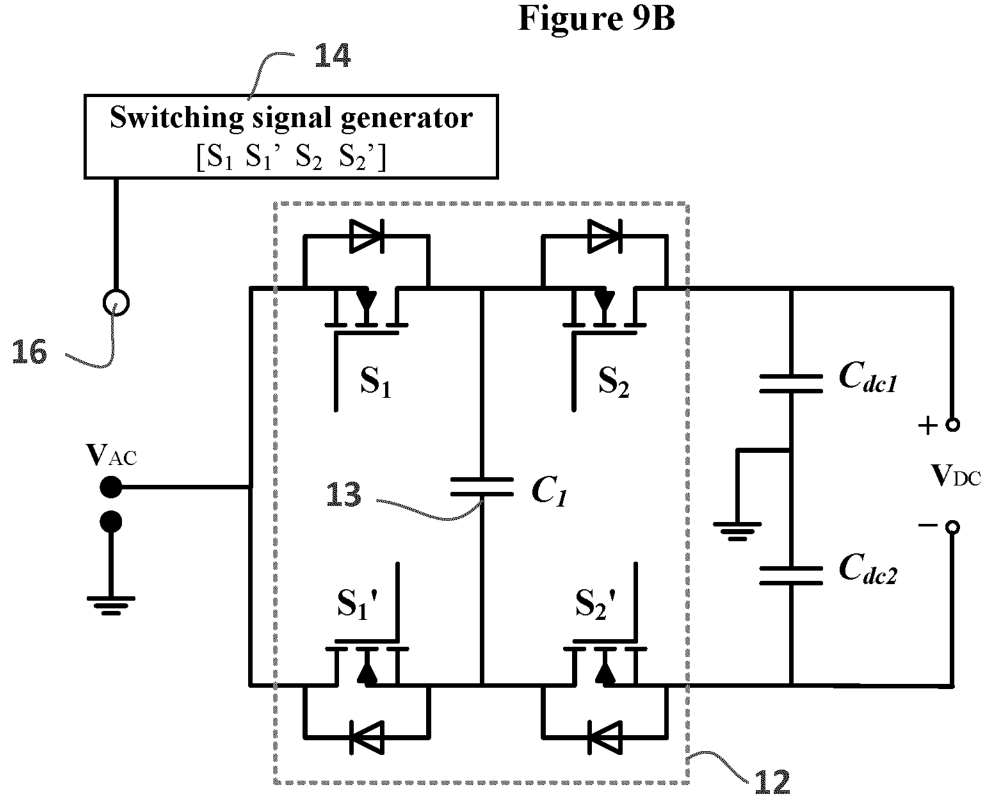
FIG. 9B shows a schematic illustration of a three-level flying capacitor converter (3L-FC) in a power rectifier configuration, where its switches are controlled with the signal of the switching signal generator.

This proposed method can be implemented to converters while combining one or more pulse width modulation methods. The converter can be and is not limited to a rectifier, an inverter, a MLC or a combination thereof. In some embodiments, the MLC is a five-level MLC, a three-level converter, a three-level inverter as illustrated in FIG. 9A, a three-level rectifier as illustrated in FIG. 9B, etc. It will be appreciated that a three-level converter (e.g., 3L-FC or 3L parallel converter) or a five-level converter, including the described 5L-ANPC, can also be used as a power inverter (DC in, AC out), a power rectifier (AC in, DC out) and/or a combination thereof, such as a five-level or three-level hybrid variable-frequency AC power converter by connecting the output of a five-level or three-level rectifier to the input of a five-level or three-level inverter. In some embodiments, the MLC is used as a three-phase variable frequency motor drive. In some embodiments, a three-phase variable frequency motor drive comprising three MLCs can have one switching signal modulator for all of the switches of the converters, where the reference signal 16 is used to generate tree phase-shifted reference signals (120° phase shift between each of these reference signals) be compared to the same carrier signal 32 to drive the three-phase variable frequency motor.

Figure 10:
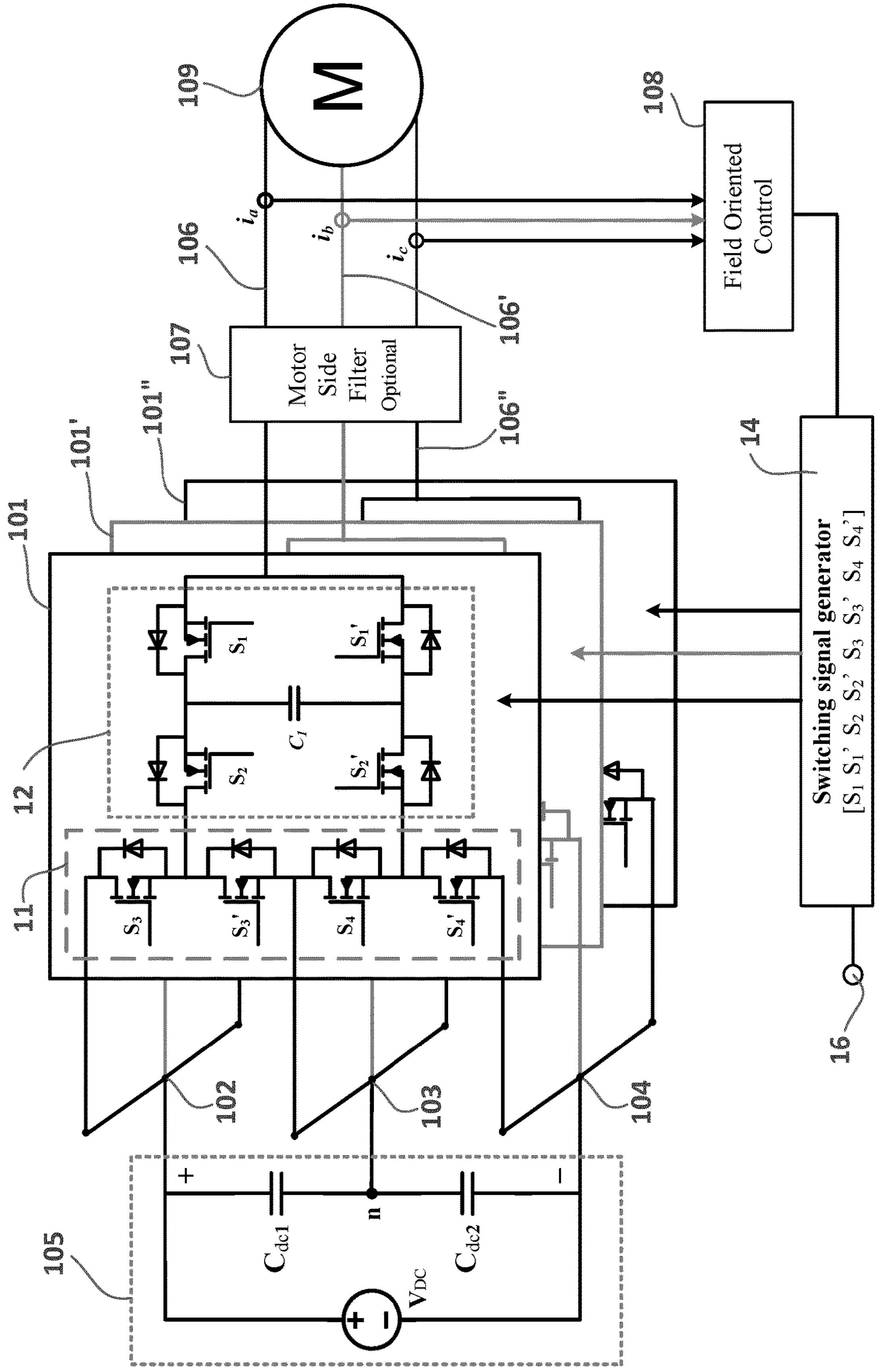
FIG. 10 shows a schematic illustration of three 5L-ANPC inverters in a three-phase variable frequency motor drive configuration, where its switches are controlled with the signal of the switching signal generator.

FIG. 10 shows an embodiment of such a three-phase variable frequency motor drive that utilizes three switch cell 101 (pair of LF 11 and HF 12 cells) of five-level inverters connected in parallel at their positive DC current 102, neutral 103 or ground and negative DC current 104 connections to generate three AC power outputs 106 phase-shifted by 120 degrees used to drive a three-phase motor 109. In this embodiment, the three switch cells 101 are sharing a common DC terminal circuitry 105, which can comprise a DC power input ($V_{DC}$) and a pair of high-voltage capacitors ($C_1$ and $C_2$). This embodiment can also comprise a motor side filter 107 before the motor inputs and a field orientated control 108 for controlling the three-phase variable frequency motor drive output in order to adjust the switching signal generated by the switching signal generator and generate proper output voltage and frequency to control the motor.

Figure 11:
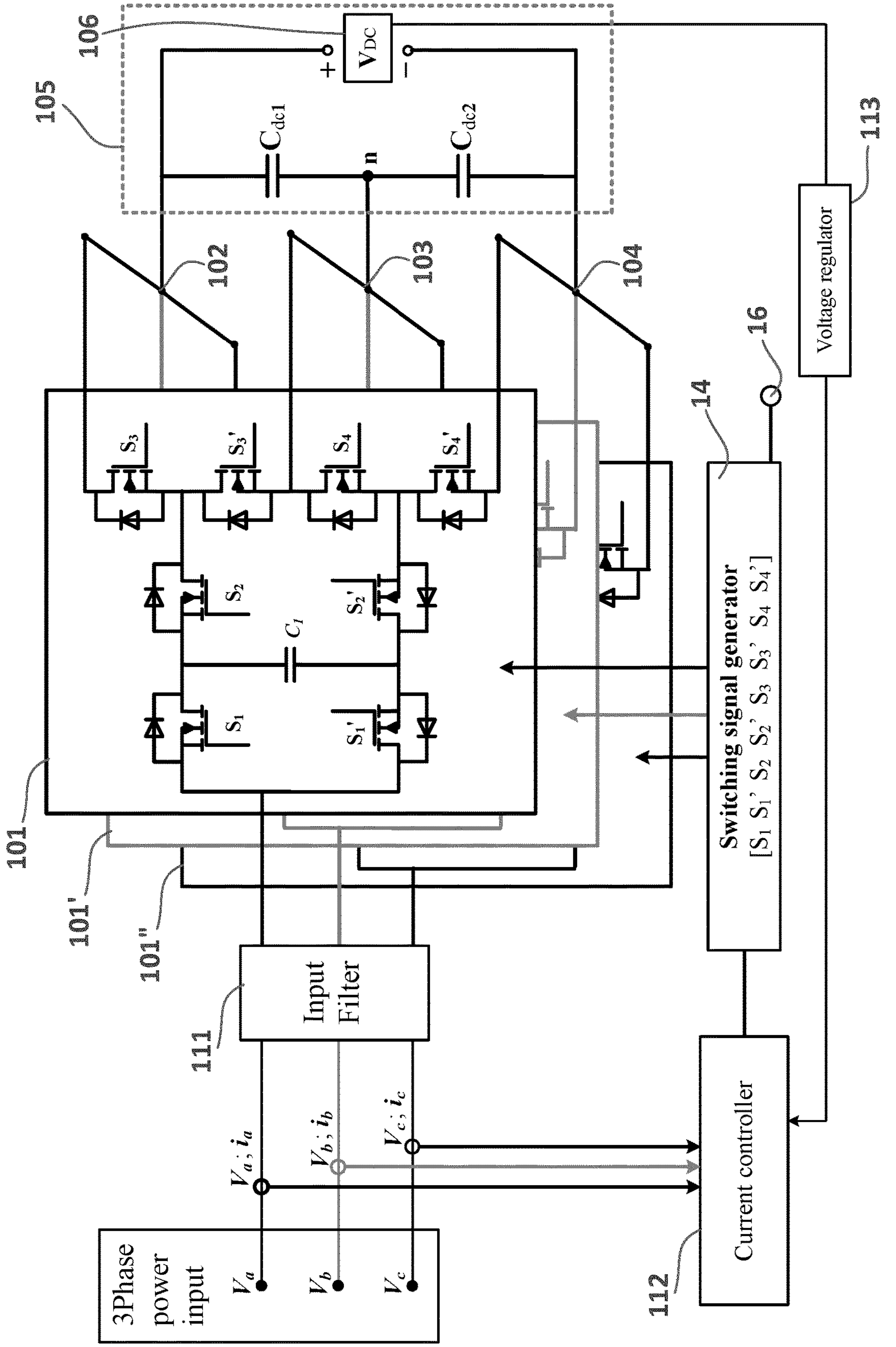
FIG. 11 shows a schematic illustration of three 5L-ANPC rectifiers in a three-phase active-front-end (AFE) rectifier configuration, where its switches are controlled with the signal of the switching signal generator.

It will be appreciated that the switching signal generator can be used to drive the switches of MLC in a three-phase active-front-end rectifier configuration. FIG. 11 shows one embodiment of such a three-phase rectifier that utilizes three switch cell 101 of five-level inverters connected in parallel at their positive current 102, neutral 103 and negative current 104 connections to generate a single DC power output 106. In this embodiment, while each of the three switch cells 101 have an AC power input ($V_a$, $V_b$ or $V_c$), they share a common DC terminal circuitry 105, which can comprise a pair of high-voltage capacitors ($C_1$ and $C_2$) and a single DC power output ($V_{DC}$) 106. Some embodiments can also comprise an input filter 111 before the switch cells; a current controller 112 for controlling the AC input currents and a voltage regulator 113 to adjust the switching signal generated by the switching signal generator and regulate the output DC voltage to its desired value.

Figure 12:
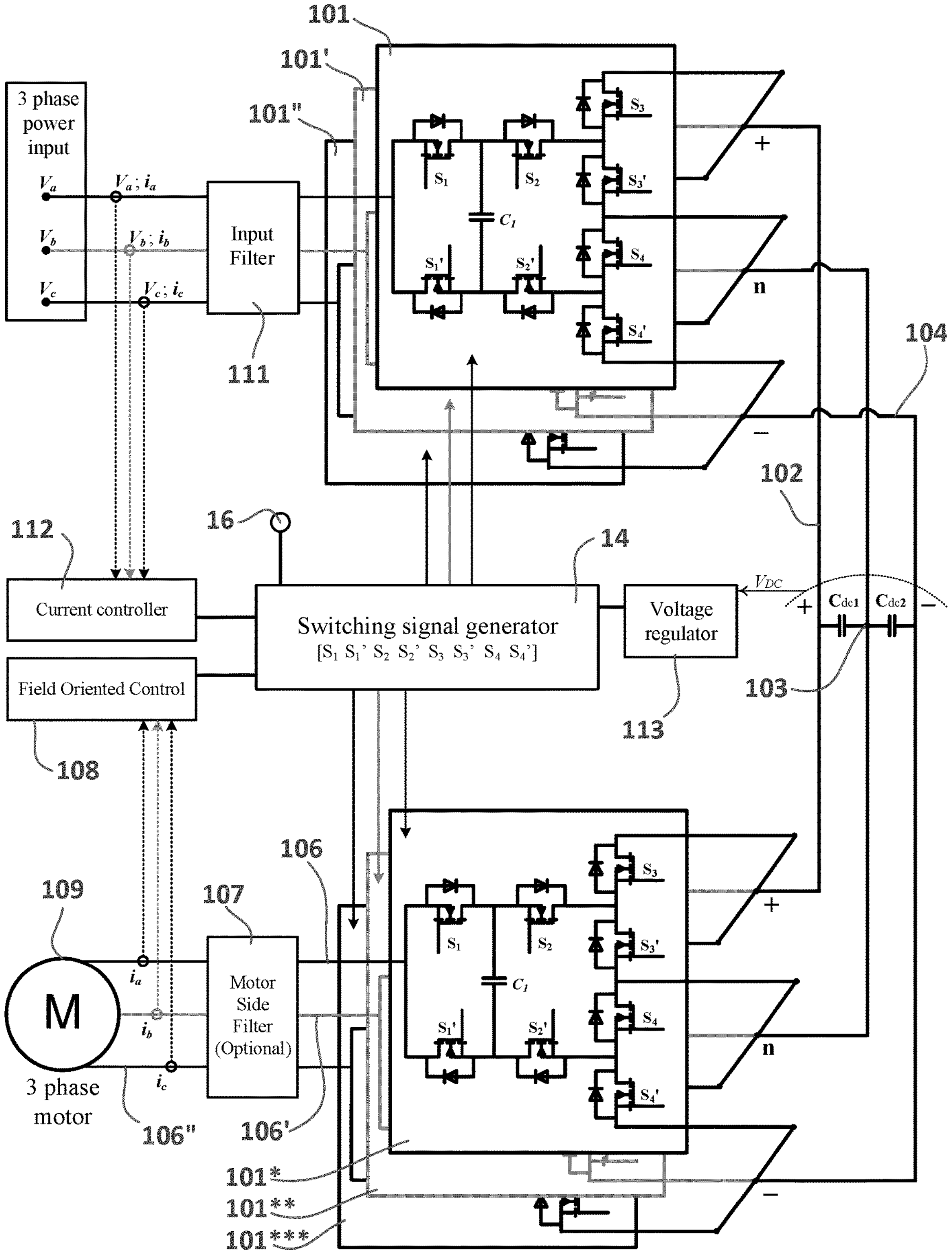
FIG. 12 shows a schematic illustration of six 5L-ANPC converters in a three-phase bidirectional back-to-back converter configuration, where its switches are controlled with the signal of the switching signal generator.

FIG. 12 shows one embodiment of a three-phase bidirectional back-to-back converter comprising the MLC of FIG. 11 connected the MLC of FIG. 10 at their high-frequency capacitors connections (negative DC current 104 to negative DC current, neutral 103 to neutral and positive DC current 102 to positive DC current). In this configuration, the inputs are three AC voltages $V_a$, $V_b$ and $V_c$ (one for each input switching cells) and the outputs are three AC outputs 106 phase-shifted by 120 degrees used to drive a three-phase motor 109. This embodiment can also comprise an input filter 111 before the power rectifier switch cells (101, 101' and 101"); a current controller 112 for controlling the AC input currents, a voltage regulator 113 for regulating the DC link voltage, a motor side filter 107 before the motor inputs and/or a field orientated control for adjusting the AC outputs. The described embodiments can comprise a switching signal generator for each one of the switching cells, a single switching signal generator for all of the cells or any configuration in between.

While the MLC presented in this description was focused on 5L-ANPC, 3L parallel converter and 3L-FC, it will be appreciated that the MLC can be any alternative configuration that comprises a flying capacitor, including; flying capacitor multicell (FCM) converters, stack multicell (SM) converters, N-level ANPCs, full-bridge modular multilevel converters (FB-MMC), half-bridge modular multilevel converters (HB-MMC), quadrupled neutral point clamped (Q-NPC) converters, quadrupled hybrid neutral point clamped (Q-HNPC) converters, etc.

While most of the present disclosure focuses on embodiments comprising flying capacitors as the energy storing circuitry component of the circuitry presented herein (5L-ANPC, 3L-FC, etc.), it will be appreciated by someone skilled in the art that, alternative converters comprising a variety of alternative energy storing circuitry components used to balance the energy across the circuitry, herein referred to as an energy balancing component (e.g., flying capacitor, inductors, leg inductors), can utilize the proposed switching method. In fact, the proposed single-carrier RFFS-PWM method can serve to reduce energy variation (e.g., voltage ripples in flying capacitors, current ripples in leg inductors) across the alternative energy balancing circuitry components some of these alternative converters.

While the embodiments of converters presented herein can comprise a flying capacitor (FC) in which the FC voltage is regulated to its desired value by applying the proposed RFFS-PWM method without utilizing any additional voltage sensor and closed-loop voltage controller, the proposed sensor-less single-carrier RFFS-PWM method can also be applied to alternative three-level converters (alternative or dual circuits) of the 3L-FCM converter. In an embodiment, the dual three-level FCM converter can be a three-level parallel converter as schematized diagram in FIG. 13.

It will be appreciated by someone skilled in the art that electrical dualities, in electrical terms, are associated into pairs called duals. For example, a dual of a relationship is formed by interchanging voltage and current in an expression.

Figure 13:
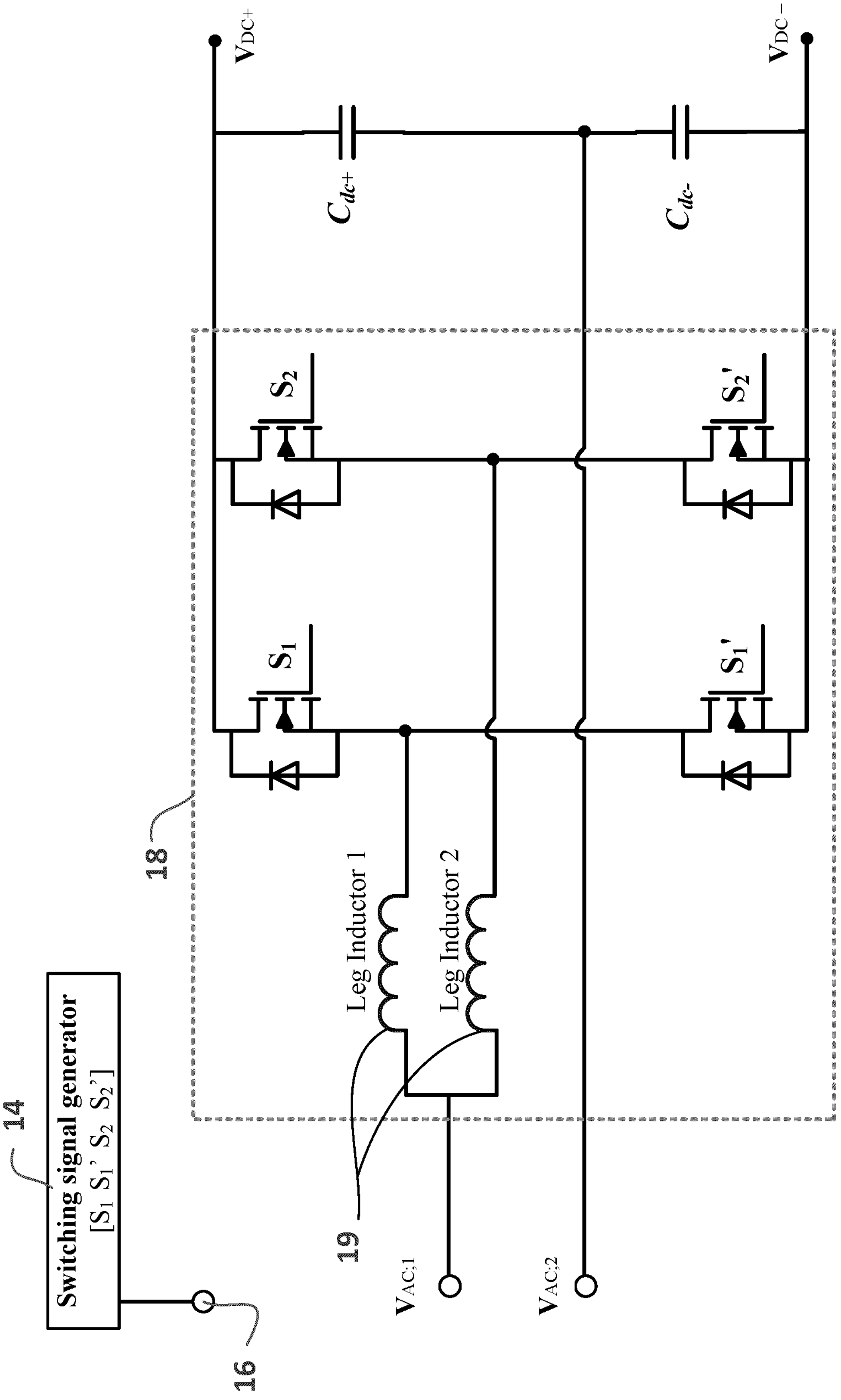
FIG. 13 shows a schematic illustration of a three-level (3L) parallel converter with leg inductors, where the energy balancing component of the circuitry is two leg inductors instead of a flying capacitor and where the switches are controlled with the signal of the switching signal generator.

The embodiment of a 3L parallel converter as schematized in FIG. 13 can comprise circuitry components similar to the ones comprised in the embodiments of a 3L-FCM illustrated in FIGS. 9A and 9B. A 3L parallel can comprise a high-frequency double leg inductor cell 18, which can include a pair of inductors 19 (e.g., leg inductors) connected on one side (at one end) to an AC terminal ($V_{AC;1}$), to pairs of switches (e.g., S1/S1' and S2/S2') each connected at one end the another opposed end of one of the pair of a different of the leg inductors (e.g., leg inductor 1 and leg inductor 2, respectively). The 3L parallel can further comprise a DC terminal having each of its terminals (e,g, $V_{DC+}$ and $V_{DC-}$) connected to another opposed end of the pairs of switches (S1/S1' and S2/S2') and to a first end of one of a pair of capacitors (e.g., $C_{dc+}$ and $C_{dc-}$, respectively), where both of the other ends of the pair of capacitors ($C_{dc+}$ and $C_{dc-}$) are connected to an AC terminal ($V_{AC;2}$). Note that a 3L parallel may not have any flying capacitor as an energy storing component since the energy balancing component can be the two inductors (e.g., leg inductors). The two pairs of switches can be controlled/driven by an embodiment of the switching signal generators 14.

Applying the proposed single-carrier RFFS-PWM method to dual three-level converters which include the 3L-FCM and the 3L-parallel converters comprising dual energy balancing components including flying capacitor in the 3L-FCM converter and leg inductors in the 3L parallel converter, dual operation of the three-level converters can be achieved. For example, 3L parallel converters can have dualities to 3L-FCM converter when employing the proposed RFFS-PWM, which can include the following:

- Both the voltage value of the flying capacitor 13 of a the 3L-FCM converter and the currents of the two inductors 19 of a 3L parallel converter can be regulated/balanced.
- As for a 3L-FCM converter, odd multiples of the switching harmonic clusters can also be canceled out in the 3L parallel converter which can also lead to significant improvement, similarly to the 3L-FCM converter, of the switching harmonic spectrum of the 3L parallel converter.
- As for a 3L-FCM converter, the proposed symmetrical charge/discharge method that may be utilized in the proposed RFFS-PWM method can also lead to a balancing of the current of the leg inductors 19 of a 3L parallel converter.
- Accordingly, it will be appreciated that the proposed RFFS-PWM method as presented herein can also be applied to the 3L parallel converter in the same way in the 3L-FCM converter.

What is claimed is:

1. A multi-level power converter comprising:

a DC terminal;

an AC terminal;

one of:

a flying capacitor;

a pair of switches S1, S1' connected at one end to said AC terminal and at a second end to opposed terminals of said flying capacitor; and a pair of switches S2, S2' connected at one end to opposed terminals of said flying capacitors and at a second end connected directly or indirectly to said DC terminal, wherein differential gating of S1/S1' and S2/S2' causes charging or discharging of said flying capacitor and common gating of S1/S1' and S2/S2' by-passes said flying capacitor;

and a first leg inductor connected to a first point of said AC terminal;

a second leg inductor connected to said first point of said AC terminal;

a pair of switches S1, S1' connected at one end to said first leg inductor and at a second end to opposed terminals of said DC terminal;

a pair of switches S2, S2' connected at one end to said second leg inductor and at a second end to opposed terminals of said DC terminal; and a second point of said AC terminal connected to first ends of two capacitors whose opposed second ends are connected to opposed polarities of said DC terminal, wherein differential gating of S1/S1' and S2/S2' causes differential increasing and decreasing of stored electric energy in said first leg inductor and said second leg inductor, respectively, and common gating of S1/S1' and S2/S2' causes common increasing and decreasing of stored electric energy in said first leg inductor and said second leg inductor, respectively;

and a switching signal generator for generating switching signals for driving said switches S1, S1', S2, S2' having a reference signal input and comprising one of:

a variable frequency carrier signal generator for generating a carrier signal with a frequency that varies over time and a plurality of comparators connected to said carrier signal and to said reference signal for comparing said reference signal to said carrier signal and having a comparison output connected to respective gates of said switches S1, S1', S2, S2';

and a non-transitory memory storing instructions and a processor operatively connected to respective gates of said switches S1, S1', S2, S2' for generating said switching signals for driving said switches at a frequency that varies over time;

wherein, when said frequency that varies over time changes from one frequency to another, a last switch gate pulse at said one frequency is a half pulse for one of S1/S1' and S2/S2' and a first switch gate pulse of said other frequency is a half pulse for one of S2/S2' and S1/S1' respectively.

2. The multi-level power converter of claim 1, wherein said multi-level power converter comprises said flying capacitor, said pair of switches S1, S1' connected at said one end to said AC terminal and at said second end to said opposed terminals of said flying capacitor, said pair of switches S2, S2' connected at said one end to said opposed terminals of said flying capacitors and at said second end connected directly or indirectly to said DC terminal, wherein said differential gating of S1/S1' and S2/S2' causes charging or discharging of said flying capacitor and said common gating of S1/S1' and S2/S2' by-passes said flying capacitor.

3. The multi-level power converter of claim 1, wherein said multi-level power converter comprises said first leg inductor connected to said first point of said AC terminal, said second leg inductor connected to said first point of said AC terminal, said pair of switches S1, S1' connected at said one end to said first leg inductor and at said second end to said opposed terminals of said DC terminal, said pair of switches S2, S2' connected at said one end to said second leg inductor and at said second end to said opposed terminals of said DC terminal, said second point of said AC terminal connected to said first ends of said two capacitors whose said opposed second ends are connected to said opposed polarities of said DC terminal, wherein said differential gating of S1/S1' and S2/S2' causes said differential increasing and said decreasing of stored electric energy in said first leg inductor and said second leg inductor, respectively, and said common gating of S1/S1' and S2/S2' causes said common increasing and said decreasing of stored electric energy in said first leg inductor and said second leg inductor, respectively.

4. The multi-level power converter of claim 1, wherein said switching signal generator for generating switching signals for driving said switches S1, S1', S2, S2' comprises said variable frequency carrier signal generator for generating said carrier signal with said frequency that varies over time and said plurality of comparators connected to said carrier signal and to said reference signal for comparing said reference signal to said carrier signal and having said comparison output connected to said respective gates of said switches S1, S1', S2, S2.

5. The multi-level power converter of claim 1, wherein said switching signal generator for generating switching signals for driving said switches S1, S1', S2, S2' comprises said non-transitory memory storing said instructions and said processor operatively connected to respective said gates of said switches S1, S1', S2, S2' for generating said switching signals for driving said switches at said frequency that varies over time.

6. The multi-level power converter of claim 1, wherein said switches S1, S1', S2, S2' are wide-bandgap fast power switches operating at a frequency of over about 50 KHz.

7. The multi-level power converter of claim 1, wherein said frequency that varies over time comprises a discrete frequency set centered around a central switching frequency varied following a finite sequence, wherein said finite sequence is randomly generated and periodically repeated, wherein said frequency that varies over time is varied after generating a number of pulses.

8. The multi-level power converter of claim 1, further comprising additional switches directly connected or indirectly connected to one of said pair of switches and directly connected or indirectly connected to said DC terminal or said AC terminal, wherein said switching signal generator is further generating switching signals for driving said additional switches.

9. The multi-level power converter of claim 1, wherein said switching signal generator can further use any pulse modulation method in order to reduce electromagnetic interference, spread the harmonic cluster of switching frequency, cancel odd multiples of switching frequency, reduce harmonic cluster frequency spikes or a combination thereof.

10. The multi-level power converter of claim 1, wherein said multi-level power converter further comprises two capacitors, wherein said second end of said pair of switches S2, S2' is connected to a first end of said two capacitors and is connected to said DC terminal, wherein said two capacitors are connected at a second end to neutral and together.

11. The multi-level power converter of claim 1, wherein said multi-level power converter is a five-level active neutral point clamped converter further comprises two high-voltage capacitors and additional switches, wherein;

a first pair S3, S3' of said additional switches is connected at a first end to said second end of a first one of said pair of switches S2, S2';

a second pair S4, S4' of said additional switches is connected at a first end to said second end of a second one of said pair of switches S2, S2';

a second end of a first one of said first pair S3, S3' of said additional switches is connected to a first end of a first one of said two high-voltage capacitors, wherein said first end of said first one of said two high-voltage capacitors is further connected to said DC terminal;

a second end of a first one of said first pair S4, S4' of said additional switches is connected to a first end of a second one of said two high-voltage capacitors, wherein said first end of said second one of said two high-voltage capacitors is further connected to said DC terminal; and a second end of a second one of said first pair S3, S3' of said additional switches and a second end of a second one of said first pair S4, S4' of said additional switches are connected; together, to second ends of said two high-voltage capacitors, and to neutral.

12. The multi-level power converter of claim 11, wherein said multi-level power converter is a power rectifier for converting an alternative current to a direct current, wherein said AC terminal is an AC power input of said power rectifier and said DC terminal is a DC power output of said power rectifier.

13. The multi-level power converter of claim 11, wherein said multi-level power converter is a power inverter for converting a direct current to an alternative current, wherein said DC terminal is a DC power input of said power inverter and said AC terminal is the AC power output of said power inverter.

14. A three-phase variable frequency motor drive comprising;

three of said multi-level power converter of claim 13;

wherein a negative DC current of each one of said DC power input of said power inverters are connected in parallel, wherein a positive DC current of each one of said DC power input of said power inverters are connected in parallel and wherein said neutral of each one of said power inverters are connected in parallel;

wherein said three of said power inverters share a common said two high-voltage capacitors and share a common said DC power input; and wherein said AC power output of each one of said power inverters are alternative currents phase-shifted by 120 degrees from said AC power output of each other ones of said power inverters.

15. A three-phase variable frequency motor drive of claim 14, wherein the switches of said three-phase variable frequency motor drive are driven by a common said switching signal generator.

16. The multi-level power converter of claim 1, further comprises at least one additional converter having at least one switch, wherein said converter is directly or indirectly connected to said multi-level converter, wherein said switching signal generator generates switching signals for driving the switches of said multi-level converter and for driving at least said one switch of said additional converter.

17. A bidirectional back-to-back converter comprising:

a first multi-level power converter;

said first multi-level power converter comprising:

a DC terminal;

an AC terminal;

one of:

a flying capacitor;

a pair of switches S1, S1' connected at one end to said AC terminal and at a second end to opposed terminals of said flying capacitor; and a pair of switches S2, S2' connected at one end to opposed terminals of said flying capacitors and at a second end connected directly or indirectly to said DC terminal, wherein differential gating of S1/S1' and S2/S2' causes charging or discharging of said flying capacitor and common gating of S1/S1' and S2/S2' by-passes said flying capacitor;

and a first leg inductor connected to a first point of said AC terminal;

a second leg inductor connected to said first point of said AC terminal;

a pair of switches S1, S1' connected at one end to said first leg inductor and at a second end to opposed terminals of said DC terminal;

a pair of switches S2, S2' connected at one end to said second leg inductor and at a second end to opposed terminals of said DC terminal; and a second point of said AC terminal connected to first ends of two capacitors whose opposed second ends are connected to opposed polarities of said DC terminal, wherein differential gating of S1/S1' and S2/S2' causes differential increasing and decreasing of stored electric energy in said first leg inductor and said second leg inductor, respectively, and common gating of S1/S1' and S2/S2' causes common increasing and decreasing of stored electric energy in said first leg inductor and said second leg inductor, respectively;

and a switching signal generator for generating switching signals for driving said switches S1, S1', S2, S2' having a reference signal input and comprising one of:

a variable frequency carrier signal generator for generating a carrier signal with a frequency that varies over time and a plurality of comparators connected to said carrier signal and to said reference signal for comparing said reference signal to said carrier signal and having a comparison output connected to respective gates of said switches S1, S1', S2, S2';

and a non-transitory memory storing instructions and a processor operatively connected to respective gates of said switches S1, S1', S2, S2' for generating said switching signals for driving said switches at a frequency that varies over time;

wherein, when said frequency that varies over time changes from one frequency to another, a last switch gate pulse at said one frequency is a half pulse for one of S1/S1' and S2/S2' and a first switch gate pulse of said other frequency is a half pulse for one of S2/S2' and S1/S1' respectively;

said first multi-level power converter is a five-level active neutral point clamped converter further comprises two high-voltage capacitors and additional switches, wherein;

a first pair S3, S3' of said additional switches is connected at a first end to said second end of a first one of said pair of switches S2, S2';

a second pair S4, S4' of said additional switches is connected at a first end to said second end of a second one of said pair of switches S2, S2';

a second end of a first one of said first pair S3, S3' of said additional switches is connected to a first end of a first one of said two high-voltage capacitors, wherein said first end of said first one of said two high-voltage capacitors is further connected to said DC terminal;

a second end of a first one of said first pair S4, S4' of said additional switches is connected to a first end of a second one of said two high-voltage capacitors, wherein said first end of said second one of said two high-voltage capacitors is further connected to said DC terminal; and a second end of a second one of said first pair S3, S3' of said additional switches and a second end of a second one of said first pair S4, S4' of said additional switches are connected; together, to second ends of said two high-voltage capacitors, and to neutral;

said first multi-level power converter is a power rectifier for converting an alternative current to a direct current, wherein said AC terminal is an AC power input of said power rectifier and said DC terminal is a DC power output of said power rectifier;

a second multi-level power converter;

said second multi-level power converter comprising:

a DC terminal;

an AC terminal;

one of:

a flying capacitor;

a pair of switches S1, S1' connected at one end to said AC terminal and at a second end to opposed terminals of said flying capacitor; and a pair of switches S2, S2' connected at one end to opposed terminals of said flying capacitors and at a second end connected directly or indirectly to said DC terminal, wherein differential gating of S1/S1' and S2/S2' causes charging or discharging of said flying capacitor and common gating of S1/S1' and S2/S2' by-passes said flying capacitor;

and a first leg inductor connected to a first point of said AC terminal;

a second leg inductor connected to said first point of said AC terminal;

a pair of switches S1, S1' connected at one end to said first leg inductor and at a second end to opposed terminals of said DC terminal;

a pair of switches S2, S2' connected at one end to said second leg inductor and at a second end to opposed terminals of said DC terminal; and a second point of said AC terminal connected to first ends of two capacitors whose opposed second ends are connected to opposed polarities of said DC terminal, wherein differential gating of S1/S1' and S2/S2' causes differential increasing and decreasing of stored electric energy in said first leg inductor and said second leg inductor, respectively, and common gating of S1/S1' and S2/S2' causes common increasing and decreasing of stored electric energy in said first leg inductor and said second leg inductor, respectively;

and a switching signal generator for generating switching signals for driving said switches S1, S1', S2, S2' having a reference signal input and comprising one of:

a variable frequency carrier signal generator for generating a carrier signal with a frequency that varies over time and a plurality of comparators connected to said carrier signal and to said reference signal for comparing said reference signal to said carrier signal and having a comparison output connected to respective gates of said switches S1, S1', S2, S2';

and a non-transitory memory storing instructions and a processor operatively connected to respective gates of said switches S1, S1', S2, S2' for generating said switching signals for driving said switches at a frequency that varies over time;

wherein, when said frequency that varies over time changes from one frequency to another, a last switch gate pulse at said one frequency is a half pulse for one of S1/S1' and S2/S2' and a first switch gate pulse of said other frequency is a half pulse for one of S2/S2' and S1/S1' respectively;

said second multi-level power converter is a five-level active neutral point clamped converter further comprises two high-voltage capacitors and additional switches, wherein;

a first pair S3, S3' of said additional switches is connected at a first end to said second end of a first one of said pair of switches S2, S2';

a second pair S4, S4' of said additional switches is connected at a first end to said second end of a second one of said pair of switches S2, S2';

a second end of a first one of said first pair S3, S3' of said additional switches is connected to a first end of a first one of said two high-voltage capacitors, wherein said first end of said first one of said two high-voltage capacitors is further connected to said DC terminal;

a second end of a first one of said first pair S4, S4' of said additional switches is connected to a first end of a second one of said two high-voltage capacitors, wherein said first end of said second one of said two high-voltage capacitors is further connected to said DC terminal; and a second end of a second one of said first pair S3, S3' of said additional switches and a second end of a second one of said first pair S4, S4' of said additional switches are connected; together, to second ends of said two high-voltage capacitors, and to neutral;

said second multi-level power converter is a power inverter for converting a direct current to an alternative current, wherein said DC terminal is a DC power input of said power inverter and said AC terminal is the AC power output of said power inverter;

wherein said AC power input of said power rectifier is an AC power input of said bidirectional back-to-back converter;

wherein said AC power output of said power inverter is an AC power output of said bidirectional back-to-back converter;

wherein a negative DC current of said DC power output of said power rectifier is connected to a negative DC current of said DC power input of said power inverter, wherein a positive DC current of said DC power output of said power rectifier is connected to a positive DC current of said DC power input of said power inverter, wherein said neutral of said power rectifier is connected to said neutral of said power inverter; and wherein said power rectifier and said power inverter share a common said two high-voltage capacitors.

18. A three-phase variable frequency motor drive comprising:

three of said bidirectional back-to-back converters of claim 17;

wherein each one of said negative DC current of said three of said bidirectional back-to-back converters are connected in parallel, wherein each one of said positive DC current of said three of said bidirectional back-to-back converters are connected in parallel and wherein each one of said neutral of said three of said bidirectional back-to-back converters are connected in parallel;

wherein said three of said bidirectional back-to-back converters share commons said two high-voltage capacitors, and wherein said power AC power output of each one of said three of said bidirectional back-to-back converters are alternative currents phase-shifted by 120 degrees from said AC power output of each other ones of said three of said bidirectional back-to-back converters.

19. A method for controlling a multi-level power converter having at least two pairs of power switches and at least one energy balancing component comprising:

using a switching signal generator to generate switching signals for driving said at least two pairs of power switches at a frequency that varies over time to reduce electromagnetic interference of said multi-level converter and to balance stored electric energy of said at least one energy balancing component, wherein, when said frequency that varies over time changes from one frequency to another frequency, a last switch gate pulse at said one frequency is a half pulse for at least one of said power switches and a first switch gate pulse of said other frequency is a half pulse for at least one other one of said power switches respectively.

20. The method of claim 19, wherein said frequency that varies over time at least one of the group consisting of:

repeated a fixed number of times that is at least two times before being changed to said other frequency; and changes from said one frequency to said other frequency to perform random pulse width modulation.

21. The method of claim 20, wherein said frequency that varies over time, said one frequency and said other frequency are selected from a discrete frequency set centered around a central switching frequency.

22. The method of claim 21, wherein changing said one frequency to said other frequency is following a finite sequence that is randomly generated and periodically repeated.

23. The method of claim 19, wherein said switching signals is generated by comparing a reference signal to a triangular periodic signal having a frequency of said frequency that varies over time, wherein said last switch gate pulse and first switch gate pulse are generated by phase-shifting said triangular periodic signal by $(2N-1)\pi$ radians when changing said frequency that varies over time.

24. The method of claim 19, wherein said at least one energy balancing component is one of the group consisting of:

at least one flying capacitor and wherein said balancing of said stored electric energy reduces high-frequency voltage ripples of a voltage of said flying capacitor; and at least a pair of leg inductors, wherein each one of said pair of leg inductors are connected to a different pair of switches, and wherein said balancing of said stored electric energy reduces amplitude of current variations in said leg inductors.

25. The method of claim 19, wherein generating said switching signals comprises comparing a reference signal to at least one carrier signal with a frequency that varies over time.

26. The method of claim 19, further comprising:

providing the multi-level power converter having at least two pairs of power switches connected to the at least one energy balancing component;

driving the multi-level power converter by controlling the at least two pairs of power switches using the generated switching.

* * * * *